United States Patent
Shulman

(10) Patent No.: US 8,271,372 B1
(45) Date of Patent: Sep. 18, 2012

(54) SYSTEM AND METHOD FOR ECONOMETRICALLY-BASED GRANT MANAGEMENT

(76) Inventor: Steven M. Shulman, Bridgewater, NH (US)

( * ) Notice: Subject to any disclaimer, the term of this patent is extended or adjusted under 35 U.S.C. 154(b) by 0 days.

(21) Appl. No.: 13/092,399

(22) Filed: Apr. 22, 2011

Related U.S. Application Data

(60) Provisional application No. 61/327,387, filed on Apr. 23, 2010.

(51) Int. Cl.
*G06Q 40/00* (2006.01)
(52) U.S. Cl. .................. 705/36 R; 705/30
(58) Field of Classification Search ............ 705/30–40
See application file for complete search history.

(56) References Cited

U.S. PATENT DOCUMENTS

| | | | |
|---|---|---|---|
| 7,003,470 B1 * | 2/2006 | Baker et al. | 705/2 |
| 7,111,010 B2 * | 9/2006 | Chen | 1/1 |
| 7,502,747 B1 * | 3/2009 | Pardo et al. | 705/7.13 |
| 7,827,081 B2 * | 11/2010 | Sinha et al. | 705/35 |
| 7,937,303 B2 * | 5/2011 | Kobeh et al. | 705/35 |
| 2003/0177481 A1 * | 9/2003 | Amaru et al. | 717/148 |
| 2005/0192826 A1 * | 9/2005 | Kanefsky | 705/1 |
| 2006/0053045 A1 * | 3/2006 | Danielson et al. | 705/10 |
| 2008/0221961 A1 * | 9/2008 | James | 705/8 |
| 2010/0049690 A1 * | 2/2010 | Byrne et al. | 707/1 |

* cited by examiner

*Primary Examiner* — Frantzy Poinvil
(74) *Attorney, Agent, or Firm* — Lando & Anastasi, LLP

(57) ABSTRACT

Systems and methods for grant management are provided. In one example, a computer system tracks grant proposals, calculates a conversion ratio that determines the percentage of grant proposals that are converted into successes and projects future research funding based on past successes that remain active and projected proposal volume and the conversion ratios.

24 Claims, 30 Drawing Sheets

| Basic Proposals | History | | Original Forecast | | |
|---|---|---|---|---|---|
| | 2010 | Base | Base | +/- | Forecast |
| NIH New Directs | 92,422,198 | 89,067,177 | Prior 2 Yr. Ave | 0% | 89,067,177 |
| NIH New Indirects | 44,313,816 | 42,694,314 | Prior 2 Yr. Ave. | 0% | 42,694,314 |
| NIH Renewal Directs | 19,851,126 | 36,574,914 | Prior 2 Yr. Ave. | 0% | 36,574,914 |
| NIH Renewal Indirects | 9,574,402 | 19,164,875 | Prior 2 Yr. Ave. | 0% | 19,164,875 |
| Other Fed New Directs | 15,035,010 | 12,543,086 | Prior 2 Yr. Ave. | 0% | 12,543,086 |
| Other Fed New Indirects | 7,942,806 | 6,425,977 | Prior 2 Yr. Ave. | 0% | 6,425,977 |
| Other Fed Renew Directs | 401,140 | 258,000 | Prior 2 Yr. Ave. | 0% | 258,000 |
| Other Fed Renew Indirects | 57,000 | 28,500 | Prior 2 Yr. Ave. | 0% | 28,500 |
| Non Fed Directs | 38,633,270 | 38,729,372 | Prior 2 Yr. Ave. | 0% | 38,729,372 |
| Non Fed Indirects | 9,834,006 | 9,565,753 | Prior 2 Yr. Ave. | 0% | 9,565,753 |
| Total | 238,064,774 | 255,051,968 | | | 255,051,968 |

FIG. 5

| Basic Proposals | 2010 | 2011 | 2012 | 2013 | 2014 | 2015 | 2016 | 2017 | 2018 | 2019 | 2020 |
|---|---|---|---|---|---|---|---|---|---|---|---|
| | | | | 20% | 30% | 40% | -20% | -30% | 30% | 20% | -20% |
| NIH New Directs | 92,422,198 | 83,449,155 | 95,008,166 | 95,008,166 | 95,008,166 | 95,008,166 | 95,008,166 | 95,008,166 | 95,008,166 | 95,008,166 | 95,008,166 |
| NIH New Indirects | 44,313,816 | 37,912,575 | 44,503,213 | 44,503,213 | 44,503,213 | 44,503,213 | 44,503,213 | 44,503,213 | 44,503,213 | 44,503,213 | 44,503,213 |
| NIH Renewal Directs | 19,851,126 | 32,604,149 | 34,589,532 | 41,507,438 | 57,709,669 | 79,293,537 | 60,434,829 | 42,304,381 | 54,995,695 | 69,744,834 | 56,545,867 |
| NIH Renewal Indirects | 9,574,402 | 16,731,215 | 17,948,045 | 21,537,654 | 29,798,851 | 40,998,431 | 31,358,824 | 21,951,177 | 28,536,530 | 36,043,737 | 29,194,969 |
| Other Fed New Directs | 15,035,010 | 10,404,423 | 11,473,755 | 11,473,755 | 11,473,755 | 11,473,755 | 11,473,755 | 11,473,755 | 11,473,755 | 11,473,755 | 11,473,755 |
| Other Fed New Indirects | 7,942,806 | 5,442,593 | 5,934,285 | 5,934,285 | 5,934,285 | 5,934,285 | 5,934,285 | 5,934,285 | 5,934,285 | 5,934,285 | 5,934,285 |
| Other Fed Renew Directs | 401,140 | 65,100 | 161,550 | 161,550 | 161,550 | 161,550 | 161,550 | 161,550 | 161,550 | 161,550 | 161,550 |
| Other Fed Renew Indirects | 57,000 | 0 | 0 | 0 | 0 | 0 | 0 | 0 | 0 | 0 | 0 |
| Non Fed Directs | 38,633,270 | 38,560,707 | 38,645,040 | 38,645,040 | 38,645,040 | 38,645,040 | 38,645,040 | 38,645,040 | 38,645,040 | 38,645,040 | 38,645,040 |
| Non Fed Indirects | 9,834,006 | 7,315,508 | 8,440,631 | 8,440,631 | 8,440,631 | 8,440,631 | 8,440,631 | 8,440,631 | 8,440,631 | 8,440,631 | 8,440,631 |

Project Growth or Contraction in Proposal Volumes

NIH / NIH Renewal / Other Fed / Non Fed

FIG. 6

| Basic Successes | History | | Original Forecast | | | |
|---|---|---|---|---|---|---|
| | 2010 | Prior Ave | Base | +/- | Y1:Y2 | Forecast |
| NIH New Directs | 16.0% | 12.5% | Prior 2 Yr. A | 0% | 12.5% | 11,516,576 |
| NIH New Indirects | 17.1% | 12.1% | Prior 2 Yr. A | 0% | 12.1% | 5,322,146 |
| NIH Renewal Directs | 29.3% | 41.6% | Prior 2 Yr. A | 0% | 41.6% | 8,960,879 |
| NIH Renewal Indirects | 30.9% | 40.9% | Prior 2 Yr. A | 0% | 40.9% | 4,310,609 |
| Other Fed New Directs | 18.7% | 11.6% | Prior 2 Yr. A | 0% | 11.6% | 1,666,120 |
| Other Fed New Indirects | 21.3% | 10.9% | Prior 2 Yr. A | 0% | 10.9% | 823,146 |
| Other Fed Renew Directs | 0.0% | 200.0% | Prior 2 Yr. A | -200% | 0.0% | 0 |
| Other Fed Renew Indirects | 0.0% | 0.0% | Prior 2 Yr. A | 0% | 0.0% | 0 |
| Non Fed Directs | 18.9% | 18.8% | Prior 2 Yr. A | 0% | 18.8% | 7,256,341 |
| Non Fed Indirects | 20.8% | 14.4% | Prior 2 Yr. A | 0% | 14.4% | 1,402,410 |
| | | | | | | 41,258,226 |

FIG. 7

| Basic Successes | 2009/2010 | 2010/2011 | | 2011/2012 | 2012/2013 | 2013/2014 | 2014/2015 | 2015/2016 | 2016/2017 | 2017/2018 | 2018/2019 | 2019/2020 | 2020/2021 |
|---|---|---|---|---|---|---|---|---|---|---|---|---|---|
| | | | | | Project Improvement or Decline in Y1:Y2 Conversion Ratios | | | | | | | | |
| | | | NIH | | -5% | 5% | -5% | 5% | -5% | 5% | -5% | 5% | -5% |
| | | | NIH Renewal | | 0% | 0% | 0% | 0% | 0% | 0% | 0% | 0% | 0% |
| | | | Other Fed | | 0% | 0% | 0% | 0% | 0% | 0% | 0% | 0% | 0% |
| | | | Non Fed | | 0% | 0% | 0% | 0% | 0% | 0% | 0% | 0% | 0% |
| NIH New Directs | 16.0% | 8.9% | | 10.7% | 5.7% | 10.7% | 5.7% | 10.7% | 5.7% | 10.7% | 5.7% | 10.7% | 5.7% |
| NIH New Indirects | 17.1% | 9.4% | | 10.7% | 5.7% | 10.7% | 5.7% | 10.7% | 5.7% | 10.7% | 5.7% | 10.7% | 5.7% |
| NIH Renewal Directs | 29.3% | 10.8% | | 26.2% | 26.2% | 26.2% | 26.2% | 26.2% | 26.2% | 26.2% | 26.2% | 26.2% | 26.2% |
| NIH Renewal Indirects | 30.9% | 1.3% | | 21.1% | 21.1% | 21.1% | 21.1% | 21.1% | 21.1% | 21.1% | 21.1% | 21.1% | 21.1% |
| Other Fed New Directs | 18.7% | 2.8% | | 7.2% | 7.2% | 7.2% | 7.2% | 7.2% | 7.2% | 7.2% | 7.2% | 7.2% | 7.2% |
| Other Fed New Indirects | 21.3% | 1.4% | | 6.1% | 6.1% | 6.1% | 6.1% | 6.1% | 6.1% | 6.1% | 6.1% | 6.1% | 6.1% |
| Other Fed Renew Directs | 0.0% | 5.4% | | 2.7% | 2.7% | 2.7% | 2.7% | 2.7% | 2.7% | 2.7% | 2.7% | 2.7% | 2.7% |
| Other Fed Renew Indirects | 0.0% | 0.0% | | 0.0% | 0.0% | 0.0% | 0.0% | 0.0% | 0.0% | 0.0% | 0.0% | 0.0% | 0.0% |
| Non Fed Directs | 18.9% | 16.0% | | 17.4% | 17.4% | 17.4% | 17.4% | 17.4% | 17.4% | 17.4% | 17.4% | 17.4% | 17.4% |
| Non Fed Indirects | 20.8% | 12.6% | | 13.5% | 13.5% | 13.5% | 13.5% | 13.5% | 13.5% | 13.5% | 13.5% | 13.5% | 13.5% |

FIG. 8

| View | Fiscal Year | Closing |
|---|---|---|
| Administering | Jul 1 - Jun 30 | 3/31/2011 |

| | Amortize Primary Fed | Amortize Other Fed | Amortize Non Fed |
|---|---|---|---|
| Uniform | 5 | 4 | 3 |
| Sector 1 | 5 | 4 | 3 |
| Sector 2 | 4 | 3 | 3 |
| Sector 3 | 5 | 4 | 3 |
| Sector 4 | 5 | 4 | 3 |
| Sector 5 | 5 | 4 | 3 |

| Baseline Pending Cutoff From | Mega Pending Cutoff From | Pending Cutoff To |
|---|---|---|
| 3/1/2011 | 7/1/2010 | 6/30/2011 |

| Yrs. - Proposal Extrapolations | Yrs. - Success Extrapolations | Yrs. - Proposal Extensions |
|---|---|---|
| 4 | 4 | 2 |

| | Year 1 % for Primary Fed Y1:Y2 | Year 1 % for Other Fed Y1:Y2 | Year 1 % for Non Fed Y1:Y2 |
|---|---|---|---|
| Uniform | 90% | 75% | 60% |
| Sector 1 | 90% | 75% | 60% |
| Sector 2 | 90% | 75% | 60% |
| Sector 3 | 90% | 75% | 60% |
| Sector 4 | 90% | 75% | 60% |
| Sector 5 | 0% | 0% | 0% |

FIG. 9

| Basic Proposals | YTD 03/31/11 | Possible Outcomes | | | Revise Forecast? | Revised Forecast | Transition 2011>2012 | Forecast 2012 |
|---|---|---|---|---|---|---|---|---|
| | | Extrapolation | Prev. Max | Extension | | | | |
| NIH New Directs | 63,675,358 | 80,813,878 | 92,422,198 | 83,449,155 | Extension | 83,449,155 | Split | 3.4% |
| NIH New Indirects | 28,204,268 | 36,064,772 | 44,313,816 | 37,912,575 | Extension | 37,912,575 | Split | 6.3% |
| NIH Renewal Directs | 27,205,552 | 39,811,246 | 75,281,230 | 32,604,149 | Extension | 32,604,149 | Split | 6.1% |
| NIH Renewal Indirects | 15,779,218 | 21,143,190 | 38,455,814 | 16,731,215 | Extension | 16,731,215 | Split | 7.3% |
| Other Fed New Directs | 3,069,460 | 6,963,161 | 15,035,010 | 10,404,423 | Extension | 10,404,423 | Split | 10.3% |
| Other Fed New Indirects | 1,471,834 | 3,474,306 | 7,942,806 | 5,442,593 | Extension | 5,442,593 | Split | 9.0% |
| Other Fed Renew Directs | 0 | 0 | 401,140 | 65,100 | Extension | 65,100 | Split | 148.2% |
| Other Fed Renew Indirects | 0 | 0 | 57,000 | 0 | Extension | 0 | Split | 0.0% |
| Non Fed Directs | 29,790,318 | 39,793,304 | 44,799,234 | 38,560,707 | Extension | 38,560,707 | Split | 0.2% |
| Non Fed Indirects | 5,303,030 | 7,924,956 | 11,116,280 | 7,315,508 | Extension | 7,315,508 | Split | 15.4% |
| Total | 174,499,039 | 235,988,813 | | 232,485,426 | | 232,485,426 | | |

FIG. 10

| Basic Successes | YTD 03/31/11 | Possible Outcomes | | Revise Y1:Y2? | Revised Forecast | Revised 2010>2011 | Transition 2011>2012 | Forecast 2012 |
|---|---|---|---|---|---|---|---|---|
| | | Pending A | Pending B | | | | | |
| NIH New Directs | 6,522,822 | 8,144,538 | 8,435,898 | Pending A | 8,144,538 | 8.9% | Split | 10.7% |
| NIH New Indirects | 3,260,422 | 4,104,111 | 4,278,293 | Pending A | 4,104,111 | 9.4% | Split | 10.7% |
| NIH Renewal Directs | 1,745,883 | 2,288,457 | 2,437,124 | Pending A | 2,288,457 | 10.8% | Split | 26.2% |
| NIH Renewal Indirects | 111,461 | 131,420 | 154,704 | Pending A | 131,420 | 1.3% | Split | 21.1% |
| Other Fed New Directs | 236,174 | 386,849 | 318,631 | Pending A | 386,849 | 2.8% | Split | 7.2% |
| Other Fed New Indirects | 18,894 | 99,648 | 35,746 | Pending A | 99,648 | 1.4% | Split | 6.1% |
| Other Fed Renew Directs | 17,098 | 17,098 | 17,098 | Pending A | 17,098 | 5.4% | Split | 2.7% |
| Other Fed Renew Indirects | 0 | 0 | 0 | Pending A | 0 | 0.0% | Split | 0.0% |
| Non Fed Directs | 5,340,189 | 6,172,977 | 6,112,376 | Pending A | 6,172,977 | 16.0% | Split | 17.4% |
| Non Fed Indirects | 888,571 | 1,115,533 | 1,185,590 | Pending A | 1,115,533 | 12.6% | Split | 13.5% |
| | 18,141,515 | 22,460,632 | 22,975,461 | | 22,460,632 | | | |

FIG. 11

| | View | | Fiscal Year | | Closing |
|---|---|---|---|---|---|
| | Administering | | Jul 1 - Jun 30 | | 3/31/2011 |

| | Amortize Primary Fed | Amortize Other Fed | Amortize Non Fed |
|---|---|---|---|
| Uniform | 5 | 4 | 3 |
| Sector 1 | 5 | 4 | 3 |
| Sector 2 | 4 | 3 | 3 |
| Sector 3 | 5 | 4 | 3 |
| Sector 4 | 5 | 4 | 3 |
| Sector 5 | 5 | 4 | 3 |

| Baseline Pending Cutoff From | Mega Pending Cutoff From | Pending Cutoff To |
|---|---|---|
| 3/1/2011 | 7/1/2010 | 6/30/2011 |

| Yrs. - Proposal Extrapolations | Yrs. - Success Extrapolations | Yrs. - Proposal Extensions |
|---|---|---|
| 4 | 4 | 2 |

| | Year 1 % for Primary Fed Y1:Y2 | Year 1 % for Other Fed Y1:Y2 | Year 1 % for Non Fed Y1:Y2 |
|---|---|---|---|
| Uniform | 90% | 75% | 60% |
| Sector 1 | 90% | 75% | 60% |
| Sector 2 | 90% | 75% | 60% |
| Sector 3 | 90% | 75% | 60% |
| Sector 4 | 90% | 75% | 60% |
| Sector 5 | 0% | 0% | 0% |

| Sector 1 Growth | Sector 2 Growth | Sector 3 Growth |
|---|---|---|
| 5 | 0 | 0 |
| 2012 | 2013 | 2011 |
| 2012 | 2015 | 2016 |
| 1,750,000 | 1,750,000 | 500,000 |
| 250,000 | 250,000 | 350,000 |
| 3 | 3 | 3 |
| 0.5 | 0.5 | 0.6 |
| 6 | 6 | 6 |

| | Monthly Validation and Updates | |
|---|---|---|
| Proposal Data Validation | Success Data Validation | YTD Month Update |
| Monthly Recap | Upload Proposal Data | Upload Success Data |
| Refresh Main Proposal | Refresh Main Success | Validate Sponsors |
| Validate Sectors | Current Pending | Mega Grants |
| ARRA | Check Balance | Projections |

FIG. 14

Sector Main Page
Sector 1: Basic

| Basic Proposals | History 2010 | Original Forecast Base | +/- | Y1:Y2 | Forecast | YTD 03/31/11 | Possible Outcomes Extrapolation | Prev. Max | Extension | Revise Forecast? | Revised Forecast | Revised 2010>2011 | Transition 2011>2012 | Forecast 2012 |
|---|---|---|---|---|---|---|---|---|---|---|---|---|---|---|
| NIH New Directs | 92,422,198 | Prior 2 Yr. Ave. | 0% | 12.5% | 89,067,177 | 63,675,358 | 80,813,878 | 92,422,198 | 83,449,155 | Extension | 83,449,155 | -6.3% | Split | 3.4% |
| NIH New Indirects | 44,313,816 | Prior 2 Yr. Ave. | 0% | 12.1% | 42,694,314 | 28,204,268 | 36,064,772 | 44,313,816 | 37,912,575 | Extension | 37,912,576 | -11.2% | Split | 6.3% |
| NIH Renewal Directs | 19,851,126 | Prior 2 Yr. Ave. | 0% | 41.6% | 36,574,914 | 27,205,552 | 39,811,246 | 75,281,230 | 32,604,149 | Extension | 32,604,149 | -10.9% | Split | 6.1% |
| NIH Renewal Indirects | 9,574,402 | Prior 2 Yr. Ave. | 0% | 40.9% | 19,164,875 | 15,779,218 | 21,143,190 | 38,455,814 | 16,731,215 | Extension | 16,731,215 | -12.7% | Split | 7.3% |
| Other Fed New Directs | 15,035,010 | Prior 2 Yr. Ave. | 0% | 11.6% | 12,543,086 | 3,069,460 | 6,963,161 | 15,035,010 | 10,404,423 | Extension | 10,404,423 | -17.1% | Split | 10.3% |
| Other Fed New Indirects | 7,942,806 | Prior 2 Yr. Ave. | 0% | 10.9% | 6,425,977 | 1,471,834 | 3,474,306 | 7,942,806 | 5,442,593 | Extension | 5,442,593 | -15.3% | Split | 9.0% |
| Other Fed Renew Directs | 401,140 | Prior 2 Yr. Ave. | 0% | 200.0% | 258,000 | 0 | 0 | 401,140 | 65,100 | Extension | 65,100 | -74.8% | Split | 146.2% |
| Other Fed Renew Indirects | 57,000 | Prior 2 Yr. Ave. | 0% | 0.0% | 28,500 | 0 | 0 | 57,000 | 0 | Extension | 0 | -100.0% | Split | 0.0% |
| Non Fed Directs | 38,633,270 | Prior 2 Yr. Ave. | 0% | 18.8% | 38,729,372 | 29,790,318 | 39,793,304 | 44,799,234 | 38,560,707 | Extension | 38,560,707 | -0.4% | Split | 0.2% |
| Non Fed Indirects | 9,834,006 | Prior 2 Yr. Ave. | 0% | 14.4% | 9,565,753 | 5,303,030 | 7,924,956 | 11,116,280 | 7,315,508 | Extension | 7,315,508 | -23.5% | Split | 15.4% |
| Total | 238,064,774 | 255,051,968 | | | 255,051,968 | 174,499,039 | 235,988,813 | | 232,485,426 | | 232,485,426 | | | |

| Basic Successes | History 2010 | Prior Ave | Base | +/- | Y1:Y2 | Forecast | YTD 03/31/11 | Possible Outcomes Pending A | Pending B | Revise Y1:Y2? | Revised Forecast | Revised 2010>2011 | Transition 2011>2012 | Forecast 2012 |
|---|---|---|---|---|---|---|---|---|---|---|---|---|---|---|
| NIH New Directs | 16.0% | 12.5% | Prior 2 Yr. Ave. | 0% | 12.5% | 11,516,576 | 6,522,822 | 8,144,538 | 8,435,898 | Pending A | 8,144,538 | 8.9% | Split | 10.7% |
| NIH New Indirects | 17.1% | 12.1% | Prior 2 Yr. Ave. | 0% | 12.1% | 5,322,146 | 3,260,422 | 4,104,111 | 4,278,293 | Pending A | 4,104,111 | 9.4% | Split | 10.7% |
| NIH Renewal Directs | 29.3% | 41.6% | Prior 2 Yr. Ave. | 0% | 41.6% | 8,960,879 | 1,745,883 | 2,288,457 | 2,437,124 | Pending A | 2,288,457 | 10.8% | Split | 26.2% |
| NIH Renewal Indirects | 30.9% | 40.9% | Prior 2 Yr. Ave. | 0% | 40.9% | 4,310,609 | 111,461 | 131,420 | 154,704 | Pending A | 131,420 | 1.3% | Split | 21.1% |
| Other Fed New Directs | 18.7% | 11.6% | Prior 2 Yr. Ave. | 0% | 11.6% | 1,666,120 | 236,174 | 386,849 | 318,631 | Pending A | 386,849 | 2.8% | Split | 7.2% |
| Other Fed New Indirects | 21.3% | 10.9% | Prior 2 Yr. Ave. | 0% | 10.9% | 823,146 | 18,894 | 99,648 | 35,746 | Pending A | 99,648 | 1.4% | Split | 6.1% |
| Other Fed Renew Directs | 0.0% | 0.0% | Prior 2 Yr. Ave. | -200% | 0.0% | 0 | 17,098 | 17,098 | 17,098 | Pending A | 17,098 | 5.4% | Split | 2.7% |
| Other Fed Renew Indirects | 0.0% | 0.0% | Prior 2 Yr. Ave. | 0% | 0.0% | 0 | 0 | 0 | 0 | Pending A | 0 | 0.0% | Split | 0.0% |
| Non Fed Directs | 18.9% | 18.8% | Prior 2 Yr. Ave. | 0% | 18.8% | 7,256,341 | 5,340,189 | 6,172,977 | 6,112,376 | Pending A | 6,172,977 | 16.0% | Split | 17.4% |
| Non Fed Indirects | 20.8% | 14.4% | Prior 2 Yr. Ave. | 0% | 14.4% | 1,402,410 | 888,571 | 1,115,533 | 1,185,590 | Pending A | 1,115,533 | 12.6% | Split | 13.5% |
| | | | | | 41,258,226 | 18,141,515 | 22,460,632 | 22,975,461 | | 22,460,632 | | | | |

Extrapolation
Applies to Both Proposals and Successes and Projects Year End based on Prior YTD:Year End Relationships YTD Proposals

| Sector | Sponsor 2 | Data | 2004 | 2005 | 2006 | 2007 | 2008 | 2009 | 2010 | 2011 | 4 Years |
|---|---|---|---|---|---|---|---|---|---|---|---|
| Basic | NIH New | Sum of Direct | 57,384,762 | 65,370,048 | 89,202,712 | 57,795,730 | 58,758,418 | 62,855,636 | 75,731,124 | 63,675,358 | 255,140,908 |
| | | Sum of Indirect | 27,690,854 | 31,738,244 | 45,798,122 | 30,317,248 | 32,754,632 | 30,774,700 | 35,197,314 | 28,204,268 | 129,043,894 |
| | NIH Renewal | Sum of Direct | 31,585,440 | 26,791,810 | 52,004,490 | 40,668,934 | 48,310,280 | 48,663,650 | 13,688,984 | 27,205,552 | 151,331,848 |
| | | Sum of Indirect | 17,487,850 | 15,156,850 | 23,635,660 | 21,702,144 | 26,863,602 | 28,486,146 | 7,939,610 | 15,779,218 | 84,991,502 |
| | Other Fed New | Sum of Direct | 3,218,900 | 12,031,410 | 5,046,458 | 4,160,990 | 518,116 | 4,801,818 | 5,614,428 | 3,069,460 | 15,095,352 |
| | | Sum of Indirect | 1,145,400 | 6,750,474 | 2,720,058 | 2,488,838 | 265,036 | 1,864,528 | 3,045,908 | 1,471,834 | 7,664,310 |
| | Other Fed Renewal | Sum of Direct | 0 | 0 | 0 | 303,600 | 0 | 0 | 385,800 | 0 | 689,400 |
| | | Sum of Indirect | 0 | 0 | 0 | 42,000 | 0 | 0 | 57,000 | 0 | 99,000 |
| | Non Fed | Sum of Direct | 23,445,486 | 31,395,556 | 24,926,288 | 31,265,356 | 20,791,292 | 31,723,710 | 28,194,256 | 29,790,318 | 111,974,614 |
| | | Sum of Indirect | 4,340,946 | 4,557,352 | 4,477,662 | 5,055,764 | 2,974,056 | 6,885,572 | 8,220,978 | 5,303,030 | 23,136,370 |
| Clinical | NIH New | Sum of Direct | 100,410,726 | 83,625,718 | 86,854,298 | 73,208,892 | 82,671,260 | 77,792,126 | 117,625,242 | 88,583,076 | 351,297,520 |
| | | Sum of Indirect | 41,443,902 | 36,094,804 | 37,265,102 | 34,530,434 | 33,714,650 | 35,697,888 | 47,992,578 | 43,887,144 | 151,935,550 |
| | NIH Renewal | Sum of Direct | 23,046,244 | 36,989,520 | 27,390,814 | 33,883,314 | 34,387,564 | 9,498,148 | 3,285,340 | 12,935,264 | 81,054,366 |
| | | Sum of Indirect | 9,964,814 | 16,020,110 | 13,274,052 | 16,651,500 | 16,311,338 | 4,086,948 | 1,897,888 | 5,511,072 | 38,947,674 |
| | Other Fed New | Sum of Direct | 27,127,832 | 16,501,810 | 6,486,938 | 5,259,624 | 18,041,130 | 22,656,328 | 27,247,572 | 11,572,226 | 73,204,654 |
| | | Sum of Indirect | 5,500,136 | 3,824,850 | 1,841,870 | 884,890 | 6,359,636 | 5,094,538 | 8,226,534 | 3,600,648 | 20,565,598 |
| | Other Fed Renewal | Sum of Direct | 7,972,214 | 5,049,284 | 840,850 | 3,848,696 | 5,315,860 | 2,309,188 | 45,604 | 11,180,298 | 11,519,348 |
| | | Sum of Indirect | 787,112 | 615,140 | 20,000 | 174,002 | 912,896 | 394,722 | 0 | 198,372 | 1,481,620 |
| | Non Fed | Sum of Direct | 48,396,604 | 72,896,932 | 46,521,012 | 37,887,548 | 54,993,944 | 54,092,788 | 47,984,986 | 50,014,060 | 194,959,266 |
| | | Sum of Indirect | 18,785,904 | 17,955,564 | 11,387,968 | 8,031,728 | 13,218,126 | 17,568,436 | 16,231,978 | 15,836,232 | 55,050,268 |
| Central | NIH New | Sum of Direct | 4,000,000 | 0 | 300,000 | 0 | 0 | 0 | 0 | 0 | 0 |
| | | Sum of Indirect | 0 | 0 | 179,700 | 0 | 0 | 0 | 0 | 0 | 0 |
| | NIH Renewal | Sum of Direct | 0 | 0 | 0 | 0 | 0 | 0 | 0 | 0 | 0 |
| | | Sum of Indirect | 0 | 0 | 0 | 0 | 0 | 0 | 0 | 0 | 0 |
| | Other Fed New | Sum of Direct | 0 | 0 | 51,600 | 0 | 0 | 0 | 0 | 0 | 0 |
| | | Sum of Indirect | 0 | 0 | 0 | 0 | 0 | 0 | 0 | 0 | 0 |
| | Other Fed Renewal | Sum of Direct | 0 | 0 | 0 | 0 | 0 | 0 | 0 | 0 | 0 |
| | | Sum of Indirect | 0 | 0 | 0 | 0 | 0 | 0 | 0 | 0 | 0 |
| | Non Fed | Sum of Direct | 0 | 0 | 10,514,956 | 400,000 | 0 | 0 | 0 | 0 | 400,000 |
| | | Sum of Indirect | 0 | 0 | 308,458 | 0 | 0 | 0 | 0 | 0 | 0 |

*FIG. 17A*

Year End Proposals

| Sector | Sponsor 2 | Data | 2004 | 2005 | 2006 | 2007 | 2008 | 2009 | 2010 | 2011 | 4 Years |
|---|---|---|---|---|---|---|---|---|---|---|---|
| Basic | NIH New | Sum of Direct | 76,799,292 | 93,175,920 | 117,515,128 | 75,394,850 | 70,284,072 | 85,712,156 | 92,422,198 | 63,675,358 | 323,813,276 |
| | | Sum of Indirect | 35,507,852 | 43,322,482 | 60,521,244 | 40,388,658 | 39,231,026 | 41,074,812 | 44,313,816 | 28,204,268 | 165,008,312 |
| | NIH Renewal | Sum of Direct | 43,585,440 | 38,715,722 | 80,045,324 | 75,281,230 | 73,020,408 | 53,298,702 | 19,851,126 | 27,205,552 | 221,451,466 |
| | | Sum of Indirect | 24,627,490 | 22,174,106 | 37,244,728 | 37,097,866 | 38,455,814 | 28,755,348 | 9,574,402 | 15,779,218 | 113,883,430 |
| | Other Fed New | Sum of Direct | 6,222,508 | 15,460,008 | 8,084,246 | 5,489,966 | 3,668,116 | 10,051,162 | 15,035,010 | 3,069,460 | 34,244,254 |
| | | Sum of Indirect | 2,002,530 | 8,465,824 | 4,533,702 | 3,087,978 | 2,151,888 | 4,909,148 | 7,942,806 | 1,471,834 | 18,091,820 |
| | Other Fed Renewal | Sum of Direct | 0 | 0 | 0 | 303,600 | 0 | 114,860 | 401,140 | 0 | 819,600 |
| | | Sum of Indirect | 0 | 0 | 0 | 42,000 | 0 | 0 | 57,000 | 0 | 99,000 |
| | Non Fed | Sum of Direct | 26,026,032 | 35,362,900 | 32,545,902 | 44,799,234 | 27,315,444 | 38,825,474 | 38,633,270 | 30,270,318 | 149,573,422 |
| | | Sum of Indirect | 4,396,910 | 6,221,496 | 7,139,292 | 11,116,280 | 4,327,674 | 9,297,500 | 9,834,006 | 5,303,030 | 34,575,460 |
| Clinical | NIH New | Sum of Direct | 159,458,938 | 150,841,966 | 107,642,794 | 94,967,064 | 125,144,816 | 104,006,430 | 154,882,088 | 88,583,076 | 479,000,398 |
| | | Sum of Indirect | 69,058,948 | 64,278,050 | 45,945,482 | 42,150,974 | 49,411,152 | 44,365,878 | 61,597,140 | 43,887,144 | 197,525,144 |
| | NIH Renewal | Sum of Direct | 29,334,442 | 53,095,368 | 29,390,814 | 36,383,314 | 36,871,008 | 9,498,148 | 3,285,340 | 12,972,302 | 86,037,810 |
| | | Sum of Indirect | 12,707,898 | 24,206,822 | 14,472,052 | 18,149,000 | 17,663,854 | 4,086,948 | 1,897,888 | 5,524,034 | 41,797,690 |
| | Other Fed New | Sum of Direct | 40,572,724 | 25,208,552 | 9,601,560 | 14,485,898 | 32,373,986 | 33,025,080 | 32,236,172 | 11,572,226 | 112,121,136 |
| | | Sum of Indirect | 10,400,786 | 6,729,138 | 2,958,280 | 3,097,156 | 11,546,702 | 9,292,200 | 10,409,360 | 3,600,648 | 34,345,418 |
| | Other Fed Renewal | Sum of Direct | 8,252,214 | 8,061,018 | 1,214,918 | 3,848,696 | 7,318,516 | 5,617,828 | 692,772 | 11,180,298 | 17,477,812 |
| | | Sum of Indirect | 787,112 | 1,082,546 | 74,286 | 174,002 | 912,896 | 1,029,382 | 0 | 198,372 | 2,116,280 |
| | Non Fed | Sum of Direct | 58,059,012 | 91,380,158 | 65,460,738 | 48,212,500 | 66,790,468 | 73,748,680 | 60,189,218 | 50,208,090 | 248,940,866 |
| | | Sum of Indirect | 21,292,836 | 23,464,390 | 15,872,930 | 10,797,137 | 16,884,714 | 26,318,986 | 20,230,432 | 15,948,770 | 74,231,269 |
| Central | NIH New | Sum of Direct | 4,000,000 | 0 | 300,000 | 0 | 0 | 0 | 0 | 0 | 0 |
| | | Sum of Indirect | | 0 | 179,700 | 0 | 0 | 0 | 0 | 0 | 0 |
| | NIH Renewal | Sum of Direct | 0 | 0 | 0 | 0 | 0 | 0 | 0 | 0 | 0 |
| | | Sum of Indirect | 0 | 0 | 51,600 | 0 | 0 | 0 | 0 | 0 | 0 |
| | Other Fed New | Sum of Direct | 0 | 0 | 0 | 0 | 0 | 0 | 0 | 0 | 0 |
| | | Sum of Indirect | 0 | 0 | 0 | 0 | 0 | 0 | 0 | 0 | 0 |
| | Other Fed Renewal | Sum of Direct | 0 | 0 | 0 | 0 | 0 | 0 | 0 | 0 | 0 |
| | | Sum of Indirect | 0 | 0 | 0 | 0 | 0 | 0 | 0 | 0 | 0 |
| | Non Fed | Sum of Direct | 0 | 549,984 | 10,514,956 | 400,000 | 0 | 268,096 | 0 | 0 | 668,096 |
| | | Sum of Indirect | 0 | 329,442 | 308,458 | 0 | 0 | 69,708 | 0 | 0 | 69,708 |

FIG. 17B

Simulation Model (Based on Two Sectors)

| PROPOSALS | Actual 2009 | Projected Proposals 2010 | 2011 | 2012 | 2013 | 2014 |
|---|---|---|---|---|---|---|
| Basic | | | | | | |
| NIH New Directs | 127,080,218 | 127,080,218 | 127,080,218 | 127,080,218 | 127,080,218 | 127,080,218 |
| NIH New Indirects | 65,785,798 | 65,785,798 | 65,785,798 | 65,785,798 | 65,785,798 | 65,785,798 |
| NIH Renewal Directs | 31,904,105 | 31,904,105 | 31,904,105 | 31,904,105 | 31,904,105 | 31,904,105 |
| NIH Renewal Indirects | 20,452,190 | 20,452,190 | 20,452,190 | 20,452,190 | 20,452,190 | 20,452,190 |
| Other Fed New Directs | 9,906,671 | 9,906,671 | 9,906,671 | 9,906,671 | 9,906,671 | 9,906,671 |
| Other Fed New Indirects | 5,422,438 | 5,422,438 | 5,422,438 | 5,422,438 | 5,422,438 | 5,422,438 |
| Other Fed Renew Directs | 1,250,000 | 1,250,000 | 1,250,000 | 1,250,000 | 1,250,000 | 1,250,000 |
| Other Fed Renew Indirects | 750,000 | 750,000 | 750,000 | 750,000 | 750,000 | 750,000 |
| Non Fed Directs | 40,328,168 | 40,328,168 | 40,328,168 | 40,328,168 | 40,328,168 | 40,328,168 |
| Non Fed Indirects | 11,062,589 | 11,062,589 | 11,062,589 | 11,062,589 | 11,062,589 | 11,062,589 |
| | 313,940,174 | 313,940,174 | 313,940,174 | 313,940,174 | 313,940,174 | 313,940,174 |
| Clinical | | | | | | |
| NIH New Directs | 189,309,921 | 189,309,921 | 189,309,921 | 189,309,921 | 189,309,921 | 189,309,921 |
| NIH New Indirects | 98,213,527 | 98,213,527 | 98,213,527 | 98,213,527 | 98,213,527 | 98,213,527 |
| NIH Renewal Directs | 38,401,352 | 38,401,352 | 38,401,352 | 38,401,352 | 38,401,352 | 38,401,352 |
| NIH Renewal Indirects | 21,220,694 | 21,220,694 | 21,220,694 | 21,220,694 | 21,220,694 | 21,220,694 |
| Other Fed New Directs | 18,727,321 | 18,727,321 | 18,727,321 | 18,727,321 | 18,727,321 | 18,727,321 |
| Other Fed New Indirects | 11,499,582 | 11,499,582 | 11,499,582 | 11,499,582 | 11,499,582 | 11,499,582 |
| Other Fed Renew Directs | 0 | 0 | 0 | 0 | 0 | 0 |
| Other Fed Renew Indirects | 0 | 0 | 0 | 0 | 0 | 0 |
| Non Fed Directs | 67,471,229 | 67,471,229 | 67,471,229 | 67,471,229 | 67,471,229 | 67,471,229 |
| Non Fed Indirects | 24,894,975 | 24,894,975 | 24,894,975 | 24,894,975 | 24,894,975 | 24,894,975 |
| | 469,738,602 | 469,738,602 | 469,738,602 | 469,738,602 | 469,738,602 | 469,738,602 |

FIG. 18A

Y1:Y2 CONVERSION RATES

Basic

| | 2009/2010 | 2010/2011 | 2011/2012 | 2012/2013 | 2013/2014 | 2014/2015 |
|---|---|---|---|---|---|---|
| | | | | Projected | | |
| NIH New Directs | 12.9% | 12.9% | 12.9% | 12.9% | 12.9% | 12.9% |
| NIH New Indirects | 13.4% | 13.4% | 13.4% | 13.4% | 13.4% | 13.4% |
| NIH Renewal Directs | 25.7% | 25.7% | 25.7% | 25.7% | 25.7% | 25.7% |
| NIH Renewal Indirects | 13.2% | 13.2% | 13.2% | 13.2% | 13.2% | 13.2% |
| Other Fed New Directs | 0.5% | 0.5% | 0.5% | 0.5% | 0.5% | 0.5% |
| Other Fed New Indirects | 0.0% | 0.0% | 0.0% | 0.0% | 0.0% | 0.0% |
| Other Fed Renew Directs | 32.4% | 32.4% | 32.4% | 32.4% | 32.4% | 32.4% |
| Other Fed Renew Indirects | 16.1% | 16.1% | 16.1% | 16.1% | 16.1% | 16.1% |
| Non Fed Directs | 13.5% | 13.5% | 13.5% | 13.5% | 13.5% | 13.5% |
| Non Fed Indirects | 9.0% | 9.0% | 9.0% | 9.0% | 9.0% | 9.0% |
| | 13.8% | 13.8% | 13.8% | 13.8% | 13.8% | 13.8% |

Clinical

| | 2009/2010 | 2010/2011 | 2011/2012 | 2012/2013 | 2013/2014 | 2014/2015 |
|---|---|---|---|---|---|---|
| NIH New Directs | 17.3% | 17.3% | 17.3% | 17.3% | 17.3% | 17.3% |
| NIH New Indirects | 15.3% | 15.3% | 15.3% | 15.3% | 15.3% | 15.3% |
| NIH Renewal Directs | 15.8% | 15.8% | 15.8% | 15.8% | 15.8% | 15.8% |
| NIH Renewal Indirects | 12.6% | 12.6% | 12.6% | 12.6% | 12.6% | 12.6% |
| Other Fed New Directs | 0.0% | 0.0% | 0.0% | 0.0% | 0.0% | 0.0% |
| Other Fed New Indirects | 0.0% | 0.0% | 0.0% | 0.0% | 0.0% | 0.0% |
| Other Fed Renew Directs | 0.0% | 0.0% | 0.0% | 0.0% | 0.0% | 0.0% |
| Other Fed Renew Indirects | 0.0% | 0.0% | 0.0% | 0.0% | 0.0% | 0.0% |
| Non Fed Directs | 15.9% | 15.9% | 15.9% | 15.9% | 15.9% | 15.9% |
| Non Fed Indirects | 9.3% | 9.3% | 9.3% | 9.3% | 9.3% | 9.3% |
| | 14.8% | 14.8% | 14.8% | 14.8% | 14.8% | 14.8% |

*FIG. 18B*

|  | 2010 | 2011 | 2012 | 2013 | 2014 | 2015 |
|---|---|---|---|---|---|---|
|  |  | | Projected | | | |
| SUCCESSES | | | | | | |
| Basic | | | | | | |
| NIH New Directs | 16,422,906 | 16,422,906 | 16,422,906 | 16,422,906 | 16,422,906 | 16,422,906 |
| NIH New Indirects | 8,835,500 | 8,835,500 | 8,835,500 | 8,835,500 | 8,835,500 | 8,835,500 |
| NIH Renewal Directs | 8,197,525 | 8,197,525 | 8,197,525 | 8,197,525 | 8,197,525 | 8,197,525 |
| NIH Renewal Indirects | 2,702,571 | 2,702,571 | 2,702,571 | 2,702,571 | 2,702,571 | 2,702,571 |
| Other Fed New Directs | 52,834 | 52,834 | 52,834 | 52,834 | 52,834 | 52,834 |
| Other Fed New Indirects | 0 | 0 | 0 | 0 | 0 | 0 |
| Other Fed Renew Directs | 404,556 | 404,556 | 404,556 | 404,556 | 404,556 | 404,556 |
| Other Fed Renew Indirects | 120,596 | 120,596 | 120,596 | 120,596 | 120,596 | 120,596 |
| Non Fed Directs | 5,464,087 | 5,464,087 | 5,464,087 | 5,464,087 | 5,464,087 | 5,464,087 |
| Non Fed Indirects | 1,000,288 | 1,000,288 | 1,000,288 | 1,000,288 | 1,000,288 | 1,000,288 |
|  | 43,200,862 | 43,200,862 | 43,200,862 | 43,200,862 | 43,200,862 | 43,200,862 |
| Clinical | | | | | | |
| NIH New Directs | 32,787,582 | 32,787,582 | 32,787,582 | 32,787,582 | 32,787,582 | 32,787,582 |
| NIH New Indirects | 14,995,857 | 14,995,857 | 14,995,857 | 14,995,857 | 14,995,857 | 14,995,857 |
| NIH Renewal Directs | 6,074,813 | 6,074,813 | 6,074,813 | 6,074,813 | 6,074,813 | 6,074,813 |
| NIH Renewal Indirects | 2,671,003 | 2,671,003 | 2,671,003 | 2,671,003 | 2,671,003 | 2,671,003 |
| Other Fed New Directs | 0 | 0 | 0 | 0 | 0 | 0 |
| Other Fed New Indirects | 0 | 0 | 0 | 0 | 0 | 0 |
| Other Fed Renew Directs | 0 | 0 | 0 | 0 | 0 | 0 |
| Other Fed Renew Indirects | 0 | 0 | 0 | 0 | 0 | 0 |
| Non Fed Directs | 10,726,603 | 10,726,603 | 10,726,603 | 10,726,603 | 10,726,603 | 10,726,603 |
| Non Fed Indirects | 2,310,871 | 2,310,871 | 2,310,871 | 2,310,871 | 2,310,871 | 2,310,871 |
|  | 69,566,729 | 69,566,729 | 69,566,729 | 69,566,729 | 69,566,729 | 69,566,729 |
| Rank and File Successes | 2010 | 2011 | 2012 | 2013 | 2014 | 2015 |
| NIH Directs | 73,818,162 | 73,818,162 | 73,818,162 | 73,818,162 | 73,818,162 | 73,818,162 |
| NIH Indirects | 35,290,234 | 35,290,234 | 35,290,234 | 35,290,234 | 35,290,234 | 35,290,234 |
| Other Fed Directs | 457,390 | 457,390 | 457,390 | 457,390 | 457,390 | 457,390 |
| Other Fed Indirects | 120,596 | 120,596 | 120,596 | 120,596 | 120,596 | 120,596 |
| Non Fed Directs | 22,018,662 | 22,018,662 | 22,018,662 | 22,018,662 | 22,018,662 | 22,018,662 |
| Non Fed Indirects | 3,980,232 | 3,980,232 | 3,980,232 | 3,980,232 | 3,980,232 | 3,980,232 |
| Total | 135,685,275 | 135,685,275 | 135,685,275 | 135,685,275 | 135,685,275 | 135,685,275 |

*FIG. 18C*

Amortization Schedule – NIH Only

|  |  | 2010 | 2011 | 2012 | 2013 | 2014 |
|---|---|---|---|---|---|---|
| PROJECTED - NIH |  |  |  |  |  |  |
| Directs |  |  |  |  |  |  |
|  | 2004 |  |  |  |  |  |
|  | 2005 | 5,864,771 |  |  |  |  |
|  | 2006 | 9,780,691 | 4,890,346 |  |  |  |
|  | 2007 | 15,403,891 | 15,403,891 | 7,701,946 |  |  |
|  | 2008 | 12,765,615 | 12,765,615 | 12,765,615 | 6,382,808 |  |
|  | 2009 | 13,403,527 | 13,403,527 | 13,403,527 | 13,403,527 | 6,701,764 |
|  | 2010 | 7,381,816 | 14,763,632 | 14,763,632 | 14,763,632 | 14,763,632 |
|  | 2011 |  | 7,381,816 | 14,763,632 | 14,763,632 | 14,763,632 |
|  | 2012 |  |  | 7,381,816 | 14,763,632 | 14,763,632 |
|  | 2013 |  |  |  | 7,381,816 | 14,763,632 |
|  | 2014 |  |  |  |  | 7,381,816 |
|  | 2015 |  |  |  |  |  |
|  | 2016 |  |  |  |  |  |
|  | 2017 |  |  |  |  |  |
|  | 2018 |  |  |  |  |  |
|  | 2019 |  |  |  |  |  |
|  | 2020 |  |  |  |  |  |
| Projected - Model |  | 64,600,312 | 68,608,828 | 70,780,170 | 71,459,049 | 73,138,110 |
| Indirects |  |  |  |  |  |  |
|  | 2004 |  |  |  |  |  |
|  | 2005 | 2,842,807 |  |  |  |  |
|  | 2006 | 5,193,835 | 2,596,918 |  |  |  |
|  | 2007 | 8,288,944 | 8,288,944 | 4,144,472 |  |  |
|  | 2008 | 6,576,764 | 6,576,764 | 6,576,764 | 3,288,382 |  |
|  | 2009 | 6,450,142 | 6,450,142 | 6,450,142 | 6,450,142 | 3,225,071 |
|  | 2010 | 3,529,023 | 7,058,047 | 7,058,047 | 7,058,047 | 7,058,047 |
|  | 2011 |  | 3,529,023 | 7,058,047 | 7,058,047 | 7,058,047 |
|  | 2012 |  |  | 3,529,023 | 7,058,047 | 7,058,047 |
|  | 2013 |  |  |  | 3,529,023 | 7,058,047 |
|  | 2014 |  |  |  |  | 3,529,023 |
|  | 2015 |  |  |  |  |  |
|  | 2016 |  |  |  |  |  |
|  | 2017 |  |  |  |  |  |
|  | 2018 |  |  |  |  |  |
|  | 2019 |  |  |  |  |  |
|  | 2020 |  |  |  |  |  |
| Projected - Model |  | 32,881,515 | 34,499,837 | 34,816,494 | 34,441,687 | 34,986,281 |

| Duration | Amortization Factor |  |  |  |  |  |
|---|---|---|---|---|---|---|
|  | 1 | 2 | 3 | 4 | 5 | 6 |
| 2 | 4 | 2 | 4 |  |  |  |
| 3 | 6 | 3 | 3 | 6 |  |  |
| 4 | 8 | 4 | 4 | 4 | 8 |  |
| 5 | 10 | 5 | 5 | 5 | 5 | 10 |

FIG. 19

12 Month Rolling Average Y1:Y2 Conversion Ratio

| NIH PROPOSALS | | Fiscal Year End | | | Dec to Nov | | | Mar to Feb | | | Jun to May | |
|---|---|---|---|---|---|---|---|---|---|---|---|---|
| | | Directs | Indirects | | Directs | Indirects | | Directs | Indirects | | Directs | Indirects |
| Basic New | 2003 | 16,663,126 | 8,632,275 | 2003/2004 | 13,075,844 | 6,779,953 | | 13,738,156 | 7,421,507 | | 12,393,362 | 6,964,342 |
| Basic New | 2004 | 20,227,993 | 11,286,958 | 2004/2005 | 19,113,554 | 10,760,222 | | 21,541,609 | 12,125,191 | | 23,255,230 | 13,500,908 |
| Basic New | 2005 | 23,797,765 | 14,136,952 | 2005/2006 | 26,111,400 | 15,401,238 | | 25,920,166 | 15,457,600 | | 25,504,974 | 15,190,311 |
| Basic New | 2006 | 19,233,729 | 11,559,628 | 2006/2007 | 23,190,990 | 14,088,969 | | 27,077,596 | 16,492,008 | | 41,118,852 | 26,112,289 |
| Basic New | 2007 | 55,431,077 | 34,626,194 | 2007/2008 | 75,323,488 | 45,934,842 | | 91,423,154 | 55,486,220 | | 97,293,416 | 57,317,603 |
| Basic New | 2008 | 109,534,500 | 63,110,791 | 2008/2009 | 113,971,742 | 64,030,018 | | 121,201,424 | 63,788,512 | | 122,523,752 | 63,269,380 |
| Basic New | 2009 | 127,080,218 | 65,786,796 | 2009/2010 | | | | | | | | |
| Basic New | 2010 | | | | | | | | | | | |
| Basic Renewal | 2003 | 27,232,531 | 14,050,587 | 2003/2004 | 23,872,561 | 12,315,928 | | 17,511,064 | 8,216,637 | | 18,750,865 | 8,052,692 |
| Basic Renewal | 2004 | 10,483,261 | 4,630,911 | 2004/2005 | 13,031,806 | 5,020,062 | | 13,465,025 | 4,837,099 | | 9,200,340 | 3,115,761 |
| Basic Renewal | 2005 | 18,000,019 | 9,013,782 | 2005/2006 | 19,623,164 | 11,453,365 | | 24,339,717 | 14,942,277 | | 30,146,858 | 18,624,774 |
| Basic Renewal | 2006 | 29,570,819 | 17,975,316 | 2006/2007 | 32,855,834 | 20,222,139 | | 31,376,715 | 18,970,454 | | 27,321,805 | 15,869,329 |
| Basic Renewal | 2007 | 34,093,591 | 17,724,385 | 2007/2008 | 35,439,763 | 19,414,918 | | 36,947,160 | 19,281,402 | | 38,140,065 | 20,879,833 |
| Basic Renewal | 2008 | 34,905,232 | 21,572,382 | 2008/2009 | 35,236,445 | 21,397,003 | | 34,319,028 | 23,418,805 | | 33,285,023 | 21,691,986 |
| Basic Renewal | 2009 | 31,904,105 | 20,452,190 | 2009/2010 | | | | | | | | |
| Basic Renewal | 2010 | | | | | | | | | | | |
| Clinical New | 2003 | 28,716,773 | 13,109,160 | 2003/2004 | 30,760,787 | 13,870,617 | | 37,978,284 | 17,960,390 | | 34,172,754 | 17,165,264 |
| Clinical New | 2004 | 36,350,610 | 16,508,559 | 2004/2005 | 40,425,583 | 19,336,310 | | 43,322,102 | 19,877,321 | | 41,261,145 | 19,832,530 |
| Clinical New | 2005 | 38,531,658 | 19,196,237 | 2005/2006 | 36,834,884 | 17,818,299 | | 33,275,150 | 15,581,104 | | 33,608,478 | 15,793,879 |
| Clinical New | 2006 | 33,199,932 | 16,609,948 | 2006/2007 | 35,487,822 | 17,827,550 | | 63,728,728 | 37,160,448 | | 80,000,139 | 45,457,661 |
| Clinical New | 2007 | 108,157,377 | 60,252,589 | 2007/2008 | 143,043,167 | 82,518,956 | | 135,189,024 | 75,121,631 | | 141,082,823 | 75,573,705 |
| Clinical New | 2008 | 139,233,800 | 73,918,569 | 2008/2009 | 143,802,177 | 70,996,380 | | 177,360,329 | 88,766,743 | | 190,803,698 | 98,337,259 |
| Clinical New | 2009 | 189,309,921 | 98,213,527 | 2009/2010 | | | | | | | | |
| Clinical New | 2010 | | | | | | | | | | | |
| Clinical Renewal | 2003 | 35,723,645 | 16,833,449 | 2003/2004 | 34,547,138 | 15,629,114 | | 40,905,595 | 19,964,752 | | 37,013,880 | 19,858,780 |
| Clinical Renewal | 2004 | 31,144,512 | 17,071,354 | 2004/2005 | 32,094,013 | 16,776,244 | | 26,894,186 | 14,107,426 | | 27,344,061 | 11,142,620 |
| Clinical Renewal | 2005 | 36,994,492 | 15,805,964 | 2005/2006 | 44,520,778 | 17,794,924 | | 49,648,981 | 20,128,050 | | 48,828,448 | 21,967,278 |
| Clinical Renewal | 2006 | 41,725,114 | 16,749,211 | 2006/2007 | 47,134,440 | 20,867,706 | | 41,165,930 | 18,357,826 | | 38,550,803 | 17,470,520 |
| Clinical Renewal | 2007 | 37,802,234 | 20,060,846 | 2007/2008 | 38,026,859 | 23,249,854 | | 52,780,503 | 29,782,422 | | 55,816,799 | 32,441,521 |
| Clinical Renewal | 2008 | 65,658,757 | 36,293,007 | 2008/2009 | 60,798,701 | 31,001,853 | | 49,263,641 | 26,591,529 | | 45,751,668 | 24,999,748 |
| Clinical Renewal | 2009 | 38,401,352 | 21,220,694 | 2009/2010 | | | | | | | | |
| Clinical Renewal | 2010 | | | | | | | | | | | |

*FIG. 20A*

| NIH SUCCESSES | | Fiscal Year End | | | Dec to Nov | | Mar to Feb | | Jun to May | |
|---|---|---|---|---|---|---|---|---|---|---|
| | | Directs | Indirects | | Directs | Indirects | Directs | Indirects | Directs | Indirects |
| Basic New | 2004 | 3,245,737 | 1,511,506 | 2004/2005 | 2,998,662 | 1,391,968 | 2,638,583 | 1,143,514 | 1,412,797 | 842,896 |
| Basic New | 2005 | 405,567 | 231,150 | 2005/2006 | 0 | 0 | 953,800 | 645,365 | 1,102,039 | 645,365 |
| Basic New | 2006 | 2,692,130 | 1,187,307 | 2006/2007 | 5,412,937 | 2,975,159 | 5,649,413 | 3,104,754 | 9,341,735 | 5,315,978 |
| Basic New | 2007 | 10,178,973 | 6,273,412 | 2007/2008 | 9,525,080 | 5,854,592 | 9,384,804 | 5,797,570 | 6,681,798 | 4,369,658 |
| Basic New | 2008 | 8,625,095 | 5,688,739 | 2008/2009 | 7,622,095 | 4,994,301 | 11,756,314 | 7,869,149 | 13,799,559 | 9,288,492 |
| Basic New | 2009 | 14,722,297 | 8,566,046 | 2009/2010 | 20,127,941 | 9,850,264 | 15,081,044 | 6,257,478 | 12,214,532 | 4,144,868 |
| Basic New | 2010 | | | | | | | | | |
| Basic Renewal | 2004 | 16,118,043 | 9,883,342 | 2004/2005 | 13,510,785 | 7,847,569 | 16,341,765 | 8,261,211 | 13,244,751 | 5,881,000 |
| Basic Renewal | 2005 | 18,240,422 | 8,515,395 | 2005/2006 | 16,558,184 | 7,273,948 | 11,620,579 | 5,498,509 | 11,705,081 | 5,781,377 |
| Basic Renewal | 2006 | 6,965,600 | 4,255,792 | 2006/2007 | 18,115,976 | 11,721,720 | 18,222,986 | 11,802,124 | 18,684,361 | 12,261,889 |
| Basic Renewal | 2007 | 16,952,937 | 11,186,311 | 2007/2008 | 5,682,537 | 3,721,256 | 4,707,131 | 3,118,110 | 7,187,791 | 3,639,630 |
| Basic Renewal | 2008 | 10,082,878 | 3,920,749 | 2008/2009 | 11,384,380 | 4,777,060 | 11,384,390 | 4,777,060 | 8,418,479 | 3,128,696 |
| Basic Renewal | 2009 | 8,775,863 | 2,813,588 | 2009/2010 | 7,318,924 | 1,950,671 | 7,318,924 | 1,950,671 | 8,130,653 | 3,309,948 |
| Basic Renewal | 2010 | | | | | | | | | |
| Clinical New | 2004 | 7,451,800 | 2,391,094 | 2004/2005 | 9,909,449 | 2,684,834 | 6,878,522 | 1,104,894 | 5,945,770 | 1,104,894 |
| Clinical New | 2005 | 3,709,163 | 873,404 | 2005/2006 | 233,429 | 69,077 | 705,424 | 289,376 | 981,924 | 311,498 |
| Clinical New | 2006 | 4,017,055 | 2,490,012 | 2006/2007 | 5,878,986 | 3,297,287 | 7,780,140 | 3,566,044 | 14,081,981 | 7,707,747 |
| Clinical New | 2007 | 13,635,215 | 6,214,026 | 2007/2008 | 17,190,090 | 7,516,492 | 15,112,356 | 6,996,816 | 17,219,448 | 7,205,058 |
| Clinical New | 2008 | 22,604,984 | 10,880,803 | 2008/2009 | 26,963,262 | 13,790,421 | 28,801,701 | 15,122,603 | 26,969,165 | 13,961,286 |
| Clinical New | 2009 | 26,282,872 | 12,213,727 | 2009/2010 | 24,322,900 | 9,379,585 | 24,903,486 | 9,161,462 | 19,083,387 | 6,210,691 |
| Clinical New | 2010 | | | | | | | | | |
| Clinical Renewal | 2004 | 31,670,437 | 16,642,221 | 2004/2005 | 23,506,609 | 13,148,130 | 17,637,142 | 9,889,093 | 21,916,400 | 12,367,720 |
| Clinical Renewal | 2005 | 27,615,979 | 13,894,697 | 2005/2006 | 32,685,477 | 16,559,615 | 32,061,724 | 15,984,834 | 34,046,180 | 15,114,692 |
| Clinical Renewal | 2006 | 27,772,572 | 13,596,696 | 2006/2007 | 24,077,439 | 12,177,914 | 23,406,752 | 10,888,940 | 14,997,874 | 7,984,583 |
| Clinical Renewal | 2007 | 22,673,528 | 10,051,596 | 2007/2008 | 24,750,472 | 9,983,858 | 23,622,582 | 10,537,184 | 20,368,786 | 8,527,330 |
| Clinical Renewal | 2008 | 10,185,309 | 5,042,445 | 2008/2009 | 4,445,233 | 2,983,415 | 4,340,300 | 2,629,397 | 8,751,835 | 4,335,563 |
| Clinical Renewal | 2009 | 9,308,754 | 4,093,842 | 2009/2010 | 10,005,098 | 4,544,639 | 7,841,992 | 3,336,121 | 3,815,082 | 1,869,394 |
| Clinical Renewal | 2010 | | | | | | | | | |

*FIG. 20B*

| | | Fiscal Year End | | Oct to Sep | | Jan to Dec | | Apr to Mar | |
|---|---|---|---|---|---|---|---|---|---|
| | | Directs | Indirects | Directs | Indirects | Directs | Indirects | Directs | Indirects |
| *Basic New | 2004 | 19.5% | 17.5% | 22.9% | 20.5% | 19.2% | 15.4% | 11.4% | 12.1% |
| *Basic New | 2005 | 2.0% | 2.0% | 0.0% | 0.0% | 4.4% | 5.3% | 4.7% | 4.8% |
| *Basic New | 2006 | 11.3% | 8.4% | 20.7% | 19.3% | 21.8% | 20.1% | 36.6% | 35.0% |
| *Basic New | 2007 | 52.9% | 54.2% | 41.1% | 41.6% | 34.7% | 35.2% | 16.2% | 16.7% |
| *Basic New | 2008 | 15.6% | 16.4% | 10.1% | 10.9% | 12.9% | 14.2% | 14.2% | 16.2% |
| *Basic New | 2009 | 13.4% | 13.6% | 17.7% | 15.4% | 12.4% | 9.8% | 10.0% | 6.6% |
| *Basic New | 2010 | | | | | | | | |
| *Basic Renewal | 2004 | 59.2% | 70.3% | 56.6% | 63.7% | 93.3% | 100.5% | 70.6% | 73.0% |
| *Basic Renewal | 2005 | 174.0% | 183.9% | 127.1% | 144.9% | 86.3% | 113.7% | 127.2% | 185.6% |
| *Basic Renewal | 2006 | 38.7% | 47.2% | 92.3% | 102.3% | 74.9% | 79.0% | 62.0% | 65.8% |
| *Basic Renewal | 2007 | 57.3% | 62.2% | 17.3% | 18.4% | 15.0% | 16.4% | 26.3% | 22.9% |
| *Basic Renewal | 2008 | 29.6% | 22.1% | 31.1% | 24.6% | 30.8% | 24.8% | 22.1% | 15.0% |
| *Basic Renewal | 2009 | 25.1% | 13.0% | 20.8% | 9.1% | 21.3% | 8.3% | 24.4% | 15.3% |
| *Basic Renewal | 2010 | | | | | | | | |
| *Clinical New | 2004 | 25.9% | 18.2% | 32.2% | 19.4% | 18.1% | 6.2% | 17.4% | 6.4% |
| *Clinical New | 2005 | 10.2% | 5.3% | 0.6% | 0.4% | 1.6% | 1.5% | 2.4% | 1.6% |
| *Clinical New | 2006 | 10.4% | 13.0% | 16.0% | 18.5% | 23.4% | 22.9% | 41.9% | 48.8% |
| *Clinical New | 2007 | 41.1% | 37.4% | 48.4% | 42.2% | 23.7% | 18.8% | 21.5% | 15.9% |
| *Clinical New | 2008 | 20.9% | 18.1% | 18.8% | 16.7% | 21.3% | 20.1% | 19.1% | 18.5% |
| *Clinical New | 2009 | 18.9% | 16.5% | 16.9% | 13.2% | 14.0% | 10.6% | 10.0% | 6.3% |
| *Clinical New | 2010 | | | | | | | | |
| *Clinical Renewal | 2004 | 88.7% | 98.9% | 68.0% | 84.1% | 43.1% | 48.5% | 59.2% | 62.3% |
| *Clinical Renewal | 2005 | 88.7% | 81.4% | 101.8% | 98.7% | 119.2% | 113.3% | 124.5% | 135.6% |
| *Clinical Renewal | 2006 | 75.1% | 86.0% | 54.1% | 68.4% | 47.1% | 54.1% | 30.1% | 36.3% |
| *Clinical Renewal | 2007 | 54.3% | 60.0% | 52.5% | 47.4% | 57.4% | 57.4% | 52.8% | 48.8% |
| *Clinical Renewal | 2008 | 26.9% | 25.1% | 11.7% | 12.8% | 8.2% | 8.8% | 15.7% | 13.4% |
| *Clinical Renewal | 2009 | 14.2% | 11.3% | 16.5% | 14.7% | 15.9% | 12.5% | 8.3% | 7.5% |
| *Clinical Renewal | 2010 | | | | | | | | |

*FIG. 20C*

| Department | Department - Admin. | PI | Title | FY | Month | Start | End | Sponsor 1 | Sponsor 2 | Status | Type | Directs | Indirects | Total |
|---|---|---|---|---|---|---|---|---|---|---|---|---|---|---|
| Microbiology & Im | Microbiology & Immunology | | | 2002 | JUL | 5/1/2002 | 4/30/2007 | Federal Governm | National Instit | Funded | Renewal | 1,250,000 | 726,250 | 1,976,250 |
| Genome Study | Genome Study | | | 2002 | JUL | 7/1/2001 | 12/31/2001 | Foundation | Foundation fo | Funded | Renewal | 264,880 | 10,596 | 275,476 |
| Community & Fam | Community & Family Medicine | | | 2002 | JUL | 10/1/2001 | 9/30/2004 | Foundation | Theodora B Be | Rejected | New | 1,030,649 | 61,839 | 1,092,488 |
| Microbiology & Im | Microbiology & Immunology | | | 2002 | JUL | 1/1/2002 | 12/31/2005 | Foundation | American Heal | Rejected | New | 236,364 | 23,636 | 260,000 |
| Pharmacology & T | Pharmacology & Toxicology | | | 2002 | JUL | 1/1/2002 | 12/31/2002 | Foundation | American Heal | Rejected | New | 59,091 | 5,909 | 65,000 |
| Pharmacology & T | Pharmacology & Toxicology | | | 2002 | JUL | 1/1/2002 | 12/31/2003 | Federal Governm | National Canc | Rejected | New | 100,000 | 58,250 | 158,250 |
| Medicine | Centers and Institutes | | | 2002 | JUL | 7/1/2001 | 6/30/2005 | Corporation | Aventis Pharm | Funded | New | 13,463 | 7,225 | 20,688 |
| Medicine | Medicine | | | 2002 | JUL | 1/1/2002 | 12/31/2004 | Foundation | American Heal | Rejected | New | 195,000 | 19,500 | 214,500 |
| Pathology | Pathology | | | 2002 | JUL | 1/1/2002 | 12/31/2004 | Foundation | American Heal | Rejected | New | 195,000 | 19,500 | 214,500 |
| Medicine | Medicine | | | 2002 | JUL | 1/1/2002 | 1/1/2005 | Foundation | American Heal | Rejected | New | 236,364 | 23,636 | 260,000 |
| Medicine | Medicine | | | 2002 | JUL | 1/1/2002 | 12/31/2004 | Foundation | American Heal | Rejected | New | 195,000 | 19,500 | 214,500 |
| Medicine | Centers and Institutes | | | 2002 | JUL | 7/1/2001 | 6/30/2006 | Corporation | BioNumerik Ph | Funded | New | 68,196 | 15,804 | 84,000 |
| Radiology | Radiology | | | 2002 | JUL | 1/1/2002 | 12/31/2006 | Foundation | American Heal | Rejected | New | 272,672 | 27,268 | 299,940 |
| Radiology | Radiology | | | 2002 | JUL | 1/1/2002 | 12/31/2005 | Foundation | American Heal | Rejected | New | 363,632 | 36,364 | 399,996 |
| Medicine | Medicine | | | 2002 | JUL | 9/30/2001 | 9/29/2003 | Federal Governm | Centers for Di | Rejected | New | 343,541 | 102,719 | 446,260 |
| Psychiatry | Psychiatry | | | 2002 | JUL | 7/1/2002 | 6/30/2004 | Foundation | National Allian | Rejected | New | 60,000 | 0 | 60,000 |
| Surgery | Surgery | | | 2002 | JUL | 7/31/2001 | 1/31/2003 | Federal Governm | Health Care Fi | Funded | New | 206,693 | 81,622 | 288,315 |
| Community & Fam | Community & Family Medicine | | | 2002 | JUL | 9/29/2001 | 9/28/2006 | Federal Governm | Centers for Di | Rejected | New | 2,473,977 | 516,122 | 2,990,099 |
| Pediatrics | Pediatrics | | | 2002 | JUL | 9/1/2001 | 8/31/2002 | Foundation | Butler Founda | Funded | New | 62,271 | 0 | 62,271 |
| Surgery | Surgery | | | 2002 | JUL | 12/1/2001 | 11/30/2002 | Federal Governm | Agency for He | Funded | New | 81,407 | 18,593 | 100,000 |
| Medicine | Medicine | | | 2002 | JUL | 1/1/2002 | 12/31/2004 | Foundation | American Heal | Funded | New | 195,000 | 19,500 | 214,500 |
| Genome Study | Genome Study | | | 2002 | JUL | 10/1/2001 | 9/30/2004 | Federal Governm | Health Resour | Funded | New | 1,141,187 | 58,580 | 1,199,767 |
| Pharmacology & T | Pharmacology & Toxicology | | | 2002 | JUL | 9/1/2001 | 8/31/2003 | Federal Governm | Dept of Defen | Funded | New | 105,203 | 0 | 105,203 |
| Psychiatry | Psychiatry | | | 2002 | JUL | 1/1/2002 | 12/31/2003 | Foundation | Harry Frank Gu | Rejected | New | 57,459 | 0 | 57,459 |
| Genome Study | Genome Study | | | 2002 | JUL | 10/1/2001 | 9/30/2004 | State & Local Gov | State of New H | Rejected | New | 462,326 | 120,204 | 582,530 |
| Pharmacology & T | Surgery | | | 2002 | JUL | 1/1/2002 | 12/31/2005 | Foundation | American Heal | Funded | New | 236,364 | 23,636 | 260,000 |
| Biochemistry | Biochemistry | | | 2002 | JUL | 1/1/2002 | 6/30/2005 | Federal Governm | National Instit | Funded | New | 132,556 | 0 | 132,556 |
| Genome Study | Genome Study | | | 2002 | JUL | 1/1/2002 | 12/31/2005 | Foundation | American Heal | Rejected | New | 363,636 | 36,364 | 400,000 |
| Psychiatry | Psychiatry | | | 2002 | JUL | 6/1/2001 | 9/30/2002 | Corporation | Wyeth-Ayerst | Funded | New | 65,350 | 16,640 | 81,990 |
| Neurology | Medicine | | | 2002 | AUG | 4/1/2002 | 3/31/2007 | Federal Governm | National Instit | Funded | Renewal | 1,250,000 | 694,250 | 1,944,250 |
| Microbiology & Im | Microbiology & Immunology | | | 2002 | AUG | 9/1/2002 | 8/31/2007 | Federal Governm | National Instit | Rejected | Renewal | 2,425,918 | 132,250 | 2,558,168 |

FIG. 23

SYSTEM AND METHOD FOR ECONOMETRICALLY-BASED GRANT MANAGEMENT

RELATED APPLICATIONS

This application claims priority under 35 U.S.C. §119(e) to U.S. Provisional Application Ser. No. 61/327,387, entitled "ECONOMETRICALLY-BASED GRANT FORECASTING AND MANAGEMENT SYSTEM," filed on Apr. 23, 2010, which is herein incorporated by reference in its entirety.

BACKGROUND

1. Technical Field

Aspects disclosed herein relate to systems and methods for managing funding of academic research and more particularly to systems and methods for managing portfolios of research grants.

2. Background Discussion

A large percentage of the funds used by research institutions to conduct research come from research grants. Research grants are sums of money allocated to support research within a specified domain of knowledge. Research grants issue from a variety of public and private sponsors and vary significantly in monetary value and duration. The domains of knowledge targeted by research grants may vary substantially in scope such that some research grants are generally directed to broad areas of knowledge, e.g. the study of medicine, while others are tailored to specific intellectual pursuits, e.g. the study of a recently discovered text.

Some research institutions draft and submit a large number of grant proposals in an attempt to acquire funding to support research projects that they consider to be interesting or deem important. Such institutions often build grant portfolios consisting of large numbers of research grants that provide funds to research projects for spending and indirect cost recovery. Almost universally, research institutions assess current performance and future prospects for their research portfolios by tracking "awards." Awards are annual installments released for spending by sponsors on previously funded proposals. As such, awards are a trailing indicator of past results and provide no guarantee that similar results will be achieved anytime in the future, near-term or beyond.

SUMMARY

Examples disclosed herein provide research institutions, such as public and private colleges and universities, academic medical centers, research universities, and public and private research institutes, with tools to perform a variety of management and forecasting activities with regard to their research portfolios. These management to and forecasting activities include projecting future levels of research funding, determining trends in productivity and performance that will impact funding over time, and altering funding trajectory to meet short, intermediate, and long term strategic and financial objectives. As explained further below, the examples disclosed herein provide research institutions with these capabilities by econometrically modeling research portfolios.

According to one aspect, a computer system for managing a research portfolio is provided. The computer system includes a memory, a processor coupled to the memory, an interface executed by the processor and configured to receive information describing a set of grant proposals that each have a start date and a distribution schedule that specifies at least one award and a forecast engine executed by the processor. The forecast engine is configured to process the information to determine a lifetime value for a subset of the set of grant proposals having a start date within a predetermined period and predict a currency amount of grant successes for the predetermined period based on the lifetime value and a conversion ratio.

In the computer system, the forecast engine may be configured to determine the conversion ratio based on a portion of the information that describes a past subset of the plurality of grant proposals that each have a start date prior to the predetermined period and information describing a plurality of grant successes that were produced by the past subset. In addition, members of the subset may share at least one common characteristic selected from the group comprising an investigator, a class of investigator, a class of sponsor, a sector, a grant proposal type and a funding type. Further, the forecast engine may be further configured to distribute the currency amount of grant successes according to a distribution schedule of the subset.

In the computer system, the forecast engine may be configured to determine the distribution schedule of the subset using respective distribution schedules associated with members of the subset. In addition, the distribution schedule of the subset may specify a weighted average duration of the respective individual durations. Further, the distribution schedule may specify a straight-line distribution of substantially equal distribution amounts. Further, the distribution schedule may specify an experienced-based distribution that is empirically derived from the to plurality of grant successes.

In the computer system, the forecast engine may be configured to predict the currency amount of grant successes within the predetermined period based on at least a portion of the lifetime value and actual grant successes with awards scheduled for distribution during the predetermined period. In addition, the forecast engine may be configured to adjust the at least a portion of the lifetime value to reflect additional grant proposals to be evaluated within the predetermined period. Further, the forecast engine may be configured to predict the additional grant proposals based on at least one of a historical extrapolation of period to date grant proposals, a historical extension of grant proposals having a start date prior to the predetermined period combined with actual period to date proposals and a previous maximum of grant proposals for prior periods.

In the computer system, the interface may be configured to receive information indicating an association between a grade and the lifetime value and the forecast engine is configured to adjust, responsive to receiving the grade, the conversion ratio using the grade prior to predicting the currency amount of grant successes. In addition, the grade may indicate past successes of an investigator associated with the lifetime value. Further, the grade may indicate a percentage of the lifetime value due to grant proposals that are original submissions.

In the computer system, the at least one award may be a plurality of awards and the lifetime value may be a sum of the plurality of awards. In addition, the predetermined period may be one year. Further, the at least one common characteristic may include a sector, class of sponsor and grant proposal type. Moreover, the distribution schedule of the subset may span a plurality of periods including the predetermined period.

According to another aspect, a computer implemented method for managing a research portfolio using a computer system is provided. The method includes acts of receiving, via an interface included in the computer system, information describing a set of grant proposals that each have a start date and a distribution schedule that specifies at least one award, processing, by a forecast engine included in the computer system, the information to determine a lifetime value for a subset of the set of grant to proposals having a start date within a predetermined period and predicting, by the forecast engine included in the computer system, a currency amount of grant successes for the predetermined period based on the lifetime value and a conversion ratio. In the method, the act of predicting the amount of grant successes may include an act of determining the conversion ratio based on a portion of the information that describes a past subset of the plurality of grant proposals that each have a start date prior to the predetermined period and information describing a plurality of grant successes that were produced by the past subset. In addition, the method may further include an act of predicting the currency amount of grant successes within the predetermined period based on at least a portion of the lifetime value and actual grant successes with awards scheduled for distribution during the predetermined period.

According to another aspect, a non-transitory computer readable medium having stored thereon sequences of instruction for managing a research portfolio is provided. The sequences of instruction include instructions that will cause at least one processor to receive information describing a set of grant proposals that each have a start date and a distribution schedule that specifies at least one award, determine a lifetime value for a subset of the set of grant proposals having a start date within a predetermined period and predict a currency amount of grant successes for the predetermined period based on the lifetime value and a conversion ratio. The sequences of instruction may include instructions that will cause the at least one processor to determine the conversion ratio based on a portion of the information that describes a past subset of the plurality of grant proposals that each have a start date prior to the predetermined period and information describing a plurality of grant successes that were produced by the past subset. Further, the sequences of instruction may include instructions that will further cause the at least one processor to predict the currency amount of grant successes within the predetermined period based on at least a portion of the lifetime value and actual grant successes with awards scheduled for distribution during the predetermined period.

Still other aspects, examples, and advantages of these exemplary aspects and examples, are discussed in detail below. Moreover, it is to be understood that both the foregoing information and the following detailed description are merely illustrative to examples of various aspects, and are intended to provide an overview or framework for understanding the nature and character of the claimed subject matter. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in that example and other examples. The appearances of such terms herein are not necessarily all referring to the same example.

Furthermore, in the event of inconsistent usages of terms between this document and documents incorporated herein by reference, the term usage in the incorporated references is supplementary to that of this document; for irreconcilable inconsistencies, the term usage in this document controls. In addition, the accompanying drawings are included to provide illustration and a further understanding of the various aspects and examples, and are incorporated in and constitute a part of this specification. The drawings, together with the remainder of the specification, serve to explain principles and operations of the described and claimed aspects and examples.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 5 is an exemplary interface display configured to exchange modeling parameters;

FIG. 6 is another exemplary interface display configured to exchange modeling parameters and grant data;

FIG. 7 is another exemplary interface display configured to exchange modeling parameters and grant data;

FIG. 8 is another exemplary interface display configured to exchange modeling parameters and grant data;

FIG. 9 is another exemplary interface display configured to exchange modeling parameters and grant data;

FIG. 10 is another exemplary interface display configured to exchange modeling parameters and grant data;

FIG. 11 is another exemplary interface display configured to exchange modeling parameters and grant data;

FIG. 14 is another exemplary interface display configured to exchange modeling parameters and grant data;

FIG. 15 is another exemplary interface display configured to exchange modeling parameters and grant data;

FIG. 16 is another exemplary interface display configured to exchange modeling parameters and grant data;

FIGS. 17A and 17B are a schedule of extrapolated values in accord with one example; AB FIGS. 18A, 18B and 18C are a tabular representation of an exemplary grant management system;

FIG. 19 is a tabular representation of amortization data in accord with one example;

FIGS. 20A, 20B and 20C are a tabular representation of metrics generated by an exemplary grant management system; ABC

FIG. 23 is a tabular representation of grant data.

DETAILED DESCRIPTION

Some examples disclosed herein manifest an appreciation that "successes," which are the lifetime value of funded grant proposals, are a leading indicator of the actual awards that are tracked by conventional portfolio tracking processes. Successes may begin and end at any point during a given time period and may run for varying lengths of time. For instance, some successes have durations of under a year, while others have durations of as long as five years or more.

Research institutions with significant research volumes—in the range of $50 million to $100 million or more—have hundreds or even thousands of active successes underway at any point in time. Thus, the research portfolios of these research institutions are large and dynamic. As is discussed further below, some examples manifest an appreciation that, despite their size and complexity, large research portfolios, as a whole, behave in a measurable and predictable manner. These examples utilize this understanding to model a research portfolio econometrically by grouping grant proposals and successes into pools that share common characteristics.

The examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific to implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples or elements or acts of the systems and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Grant Management System

Figure 1:
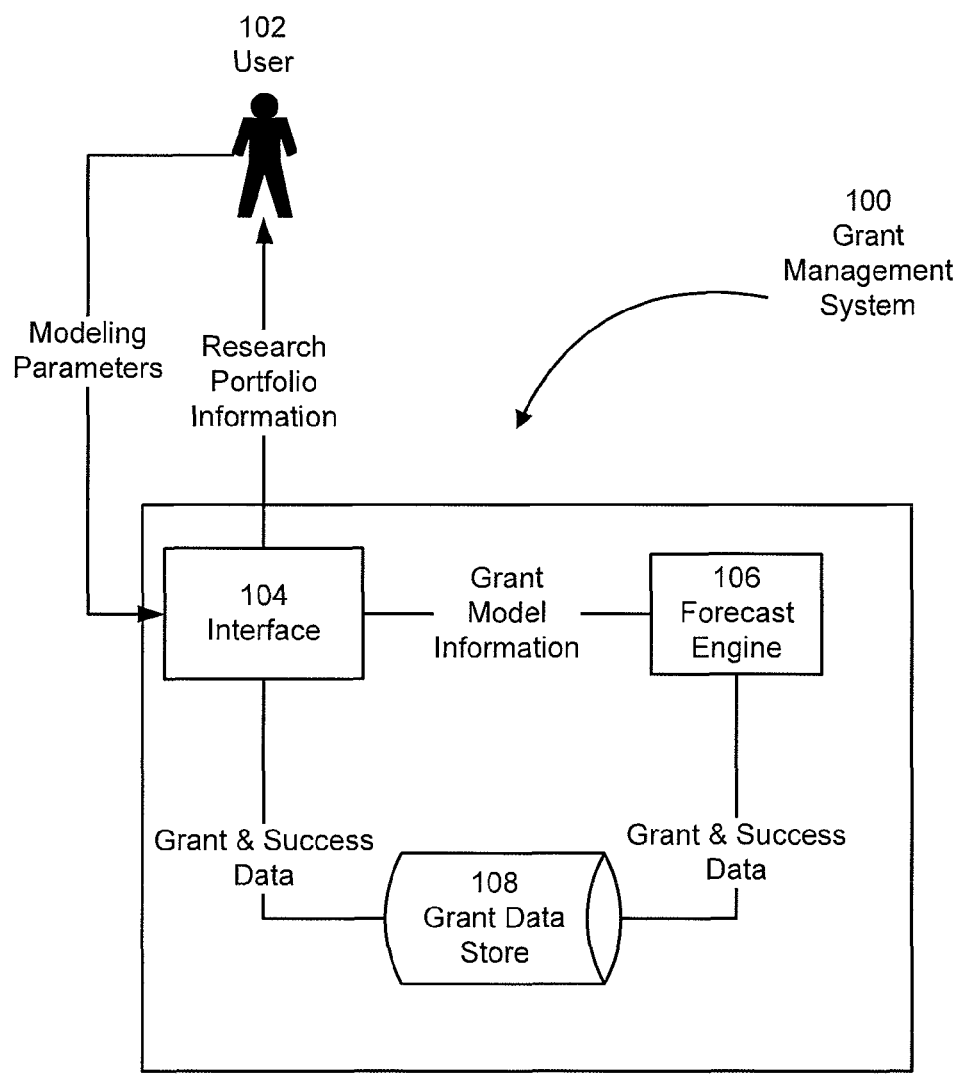
FIG. 1 is a functional schematic of one example of a grant management system.

Various examples disclosed herein implement grant management systems that econometrically model research portfolios. These grant management systems may include a variety of hardware and software components configured to perform the processes and functions described herein, and examples are not limited to a particular hardware component, software component or combination thereof. FIG. 1 illustrates a grant management system 100 according to one example, which is implemented using a computer system, such as the computer system discussed further below with reference to FIG. 2. As shown in FIG. 1, the grant management system 100 includes an interface 104, a forecast engine 106 and a grant data store 108.

The grant data store 108, which may be embodied in memory or some other form of data storage, is configured to house grant data that is used by the forecast engine 106 to model the research portfolio of a research institution. The grant data may include a variety of grant and success related information, such as historical grant to proposal data, historical grant successes achieved from past grant proposals, grant proposals that are currently in process, grant proposals planned for the future, conversion ratios of grant proposal to grant successes (such as a Y1:Y2 conversion ratio described further below), and individual and aggregated durations and amortization schedules for grant successes. To ensure the consistency and accuracy of the model, grant proposals and successes that exceed a certain dollar amount or duration are handled individually and information regarding these grant proposals and successes may be stored separately from the remainder of grant data included in the grant data store 108. The historical grant proposal data includes information identifying the sector (e.g., basic science departments, clinical departments, centers and institutes, etc.) submitting the research grant proposal, the sponsor or sponsors of the research grant, the proposed grant start and end dates, the currency amount of the grant in terms of direct grant funding and indirect cost recovery, the date the grant was submitted, the department, investigator and personnel involved in the proposed research, etc. The historical grant success data includes similar information, such as the sponsor or sponsors of the research grant, the grant start and end dates, the currency amount of the grant in terms of direct grant funding and indirect cost recovery, the date the grant was approved, the department, investigator and personnel involved in the proposed research, etc.

In some examples, the grant data store 108 also includes associations between elements of grant data. These associations are based on one or more characteristics of the grant data and are used to establish logical groups within the grant data. A non-limiting list of the characteristics upon which these associations are based includes the investigator responsible for a grant proposal, a class of the investigator, the sponsor of the grant, a class of the sponsor, a sector to which the grant is directed, a grant proposal type, the date a grant proposal will be approved or rejected and a funding type.

Particular examples may configure these associations with a variety of data values. For instance, at least one example uses classes of investigators to associate grant data with junior faculty or senior faculty investigators. In an example tailored for use in academic medical centers, sponsor types may include the National Institutes of Health (NIH), Other federal and Non-federal, and sectors may include Basic Sciences, Clinical Departments, Centers, Other Schools, etc. In an example tailored to technical institutions, sponsor types may include the National Science Foundation (NSF), and sectors may include Physics, Engineering, etc. Further, it is to be appreciated that sectors may be used to categorize grant data by organizational structure or area of focus. Areas of focus for medically oriented examples may include Cardiovascular, Cancer, Behavioral, etc. Areas of focus for a technically oriented example may include Human Genome, Quantum Physics, etc. As is discussed further below, some examples group the grant data into subsets, sometimes referred to herein as "pools," that are based on these characteristics. In these examples, each subset of grant data may have corresponding calculated metrics such as amortization schedule, summarized success duration and conversion ratios.

The forecast engine 106 is configured to determine an amount of research funding that is available in the current period and to predict the amount of research funding that will be available in the current and future periods. According to some examples, the forecast engine 106 performs tasks such as receiving grant data from the grant data store 108, receiving modeling parameters and grant data from the interface 104, processing the grant data using the modeling parameters, providing actual and predicted research portfolio information to the interface 104 and storing the actual and predicted research portfolio information in the grant data store 108. While performing the processes for which it is configured, the forecast engine 106 exchanges data with the interface 104 and the grant data store 108. When processing grant data, the forecast engine 106 performs a variety of calculations upon one or more pools of the grant data. In at least one example, the forecast engine 106 uses the associations stored in the grant data store 108 to establish these grant pools. Examples of the calculations, determinations and other processes performed by the forecast engine 106 are discussed further below with reference to FIGS. 3 and 4 and the Usage Scenarios section.

The interface 104 is configured to receive modeling parameters and to provide a variety of information descriptive of the modeled research portfolio. While performing the processes for which it is configured, the interface 104 exchanges to information with the user 102, the forecast engine 106 and the grant data store 108. Some of the information exchanged with the forecast engine 106, such as the modeling parameters, may affect the execution of the forecast engine 106. Modeling parameters are basic assumptions upon which many of the calculations performed by the forecast engine 106 are based. Examples modeling parameters include information such as a time period targeted for analysis, the characteristics defining one or more pools of grant proposals and metrics to be applied to the one or more pools during a modeling session, such as a Period 1: Period 2 (P1:P2) conversion ratio or a grade conversion ratio, as described below. Examples of the calculations, determinations and other processes performed by the interface 104 are discussed further below with reference to FIGS. 3 and 4 and the Usage Scenarios section. Exemplary interface screens displayed by the interface 104 to present the modeled research portfolio are described further below with reference to FIGS. 5-12.

Together, the data store 108, the forecast engine 106 and the interface 104 enable the user 102 to manage and forecast the results of the grant proposal and spending activities conducted by a research institution. Information may flow between these components, or any of the elements, components and subsystems disclosed herein, using a variety of techniques. Such techniques include, for example, passing the information over a network using standard protocols, such as TCP/IP, passing the information between modules in memory via an API or otherwise and passing the information by writing to a file, database, data store, or some other non-volatile data storage device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the examples disclosed herein.

Information, including grant data and modeling parameters may be stored on the grant management system 100 in any logical construction capable of storing information on a computer readable medium including, among other structures, flat files, indexed files, hierarchical databases, relational databases or object oriented to databases. The data may be modeled using unique and foreign key relationships and indexes. The unique and foreign key relationships and indexes may be established between the various fields and tables to ensure both data integrity and data interchange performance.

The interfaces disclosed herein, which include both system interfaces and user interfaces, exchange information with various information providers and information consumers. These providers and consumers may include any external entity including, among other entities, users and systems. Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the grant management system 100 or unauthorized access to the grant management system 100.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 2:
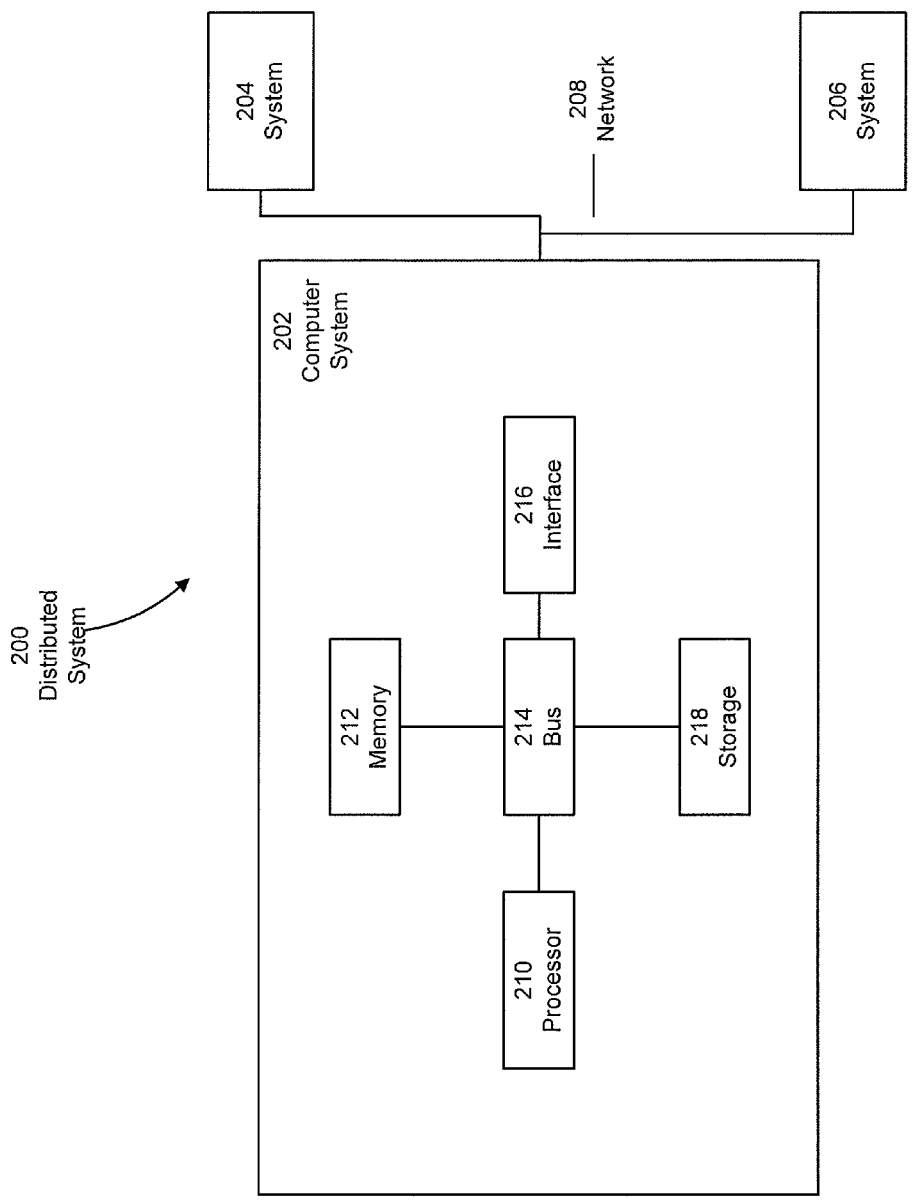
FIG. 2 is a functional block diagram of one example of a computer system that may perform processes and functions disclosed herein.

Referring to FIG. 2, there is illustrated a block diagram of a distributed computer system 200, in which various aspects and functions are practiced. As shown, the distributed computer system 200 includes one more computer systems that exchange information. More specifically, the distributed computer system 200 includes computer systems 202, 204 and 206. As shown, the computer systems 202, 204 and 206 are interconnected by, and may exchange data through, a communication network 208. The network 208 may include any communication network through which computer systems may exchange data. To exchange data using the network 208, the computer systems 202, 204 and 206 and the network 208 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 202, 204 and 206 may transmit data via the network 208 using a variety of security measures including, for example, TLS, SSL or VPN. While the distributed computer system 200 illustrates three networked computer systems, the distributed computer system 200 is not so limited and may include any number of computer systems and computing devices, networked using any medium and communication protocol.

As illustrated in FIG. 2, the computer system 202 includes a processor 210, a memory 212, a bus 214, an interface 216 and data storage 218. To implement at least some of the aspects, functions and processes disclosed herein, the processor 210 performs a series of instructions that result in manipulated data. The processor 210 may be any type of processor, multiprocessor or controller. Some exemplary to processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 210 is connected to other system components, including one or more memory devices 212, by the bus 214.

The memory 212 stores programs and data during operation of the computer system 202. Thus, the memory 212 may be a relatively high performance, volatile, random access memory such as a dynamic random access memory (DRAM) or static memory (SRAM). However, the memory 212 may include any device for storing data, such as a disk drive or other non-volatile storage device. Various examples may organize the memory 212 into particularized and, in some cases, unique structures to perform the functions disclosed herein. These data structures may be sized and organized to store values for particular data and types of data.

Components of the computer system 202 are coupled by an interconnection element such as the bus 214. The bus 214 may include one or more physical busses, for example, busses between components that are integrated within a same machine, but may include any communication coupling between system elements including specialized or standard computing bus technologies such as IDE, SCSI, PCI and InfiniBand. The bus 214 enables communications, such as data and instructions, to be exchanged between system components of the computer system 202.

The computer system 202 also includes one or more interface devices 216 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 202 to exchange information and to communicate with external entities, such as users and other systems.

The data storage 218 includes a computer readable and writeable nonvolatile, or non-transitory, data storage medium in which instructions are stored that define a program or other object that is executed by the processor 210. The data storage 218 also may include information that is recorded, on or in, the medium, and that is processed by the processor 210 during execution of the program. More specifically, the information may be stored in one or more data structures specifically configured to conserve storage space or increase data exchange performance. The instructions may be persistently stored as encoded signals, and the instructions may cause the processor 210 to perform any of the functions described herein. The medium may, for example, be optical disk, magnetic disk or flash memory, among others. In operation, the processor 210 or some other controller causes data to be read from the nonvolatile recording medium into another memory, such as the memory 212, that allows for faster access to the information by the processor 210 than does the storage medium included in the data storage 218. The memory may be located in the data storage 218 or in the memory 212, however, the processor 210 manipulates the data within the memory, and then copies the data to the storage medium associated with the data storage 218 after processing is completed. A variety of components may manage data movement between the storage medium and other memory elements and examples are not limited to particular data management components. Further, examples are not limited to a particular memory system or data storage system.

Although the computer system 202 is shown by way of example as one type of computer system upon which various aspects and functions may be practiced, aspects and functions are not limited to being implemented on the computer system 202 as shown in FIG. 2. Various aspects and functions may be practiced on one or more computers having a different architectures or components than that shown in FIG. 2. For instance, the computer system 202 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 202 may be a computer system including an operating system that manages at least a portion of the hardware elements included in the to computer system 202. In some examples, a processor or controller, such as the processor 210, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 210 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters, such as sponsor types and sectors, and thereby configure the behavior of the components.

Grant Forecasting and Management Processes

Figure 3:
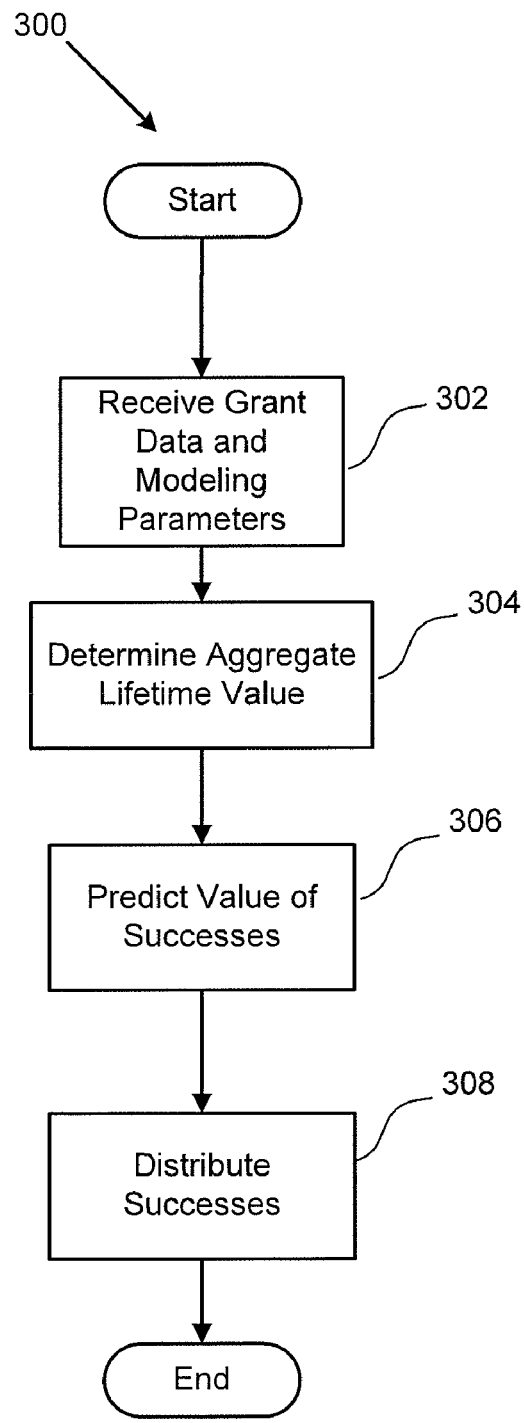
FIG. 3 is a flow diagram depicting a process for projecting success from grant proposals and a conversion ratio.

Some examples perform processes for econometrically modeling research portfolios. An example of one of these processes is illustrated in FIG. 3 as a process 300. The process 300 predicts successes for future years based on past, current and future grant proposals and conversion ratios. As shown in FIG. 3, the process 300 includes acts of receiving grant proposal data, determining the aggregate lifetime value of a pool of proposals, predicting the aggregate lifetime value of a pool of successes produced by the pool of proposals and chronologically distributing the predicted aggregate lifetime value of the pool of successes. As discussed above, the characteristics upon which pools of grant proposals and successes are created may vary widely between examples. In some examples, a grant management system executing the process 300 operates on pools that are based on common sponsor types, sectors, proposal types or any combination of these or other characteristics of grant data.

In act 302, grant proposal data for one or more pools and modeling parameters covering a target period, such as a month, quarter, year or number of years, are received. In some examples, an interface within a computer system, such as the interface 104 described above with regard to FIG. 1, receives the modeling parameters and grant proposal data from a data store, such as the grant data store 108. In other to examples, the interface 104 receives the modeling parameters and the grant proposal data from a user, such as the user 102.

In act 304, an aggregate lifetime value for the pool of grant proposals is determined based on lifetime values of individual grant proposals within the pool of grant proposals that have a start date within the target period. In at least one example, a forecast engine, such as the forecast engine 106, determines the aggregate lifetime value by parsing the target period from the model parameters and by calculating the sum of the currency values of all individual grant proposals within the pool of grant proposals that have a start date within the target period. As described above, these currency values may include project spending and indirect cost recovery components.

In act 306, an aggregate lifetime value for a pool of successes is determined In one example, the forecast engine determines this value by applying a conversion ratio to the aggregate lifetime value of the pool of grant proposals calculated in the act 304. In some examples, prior to applying the conversion ratio, the forecast engine calculates the conversion ratio based on data describing historical grant proposals and historical grant success data for successes that were produced by the historical grant proposals. In these examples, to ensure the conversion ratio is relevant to the pool of grant proposals, the forecast engine uses historical grant proposals having characteristics similar to that of the pool of grant proposals.

In at least one example, the conversion ratio determined by the forecast engine is a pool-specific P1:P2 conversion ratio. In this example, the pool-specific P1:P2conversion ratio reflects the relationship between the currency value of all grant proposals belonging to one or more specified pools that are submitted within a target period and the currency value of successes produced by those grant proposals. The pool-specific P1:P2 conversion ratio employed by the forecast engine in act 306 further reflects the fact that only a percentage of the successes achieved within a particular target period actually provide funding within the target period. Other successes begin to provide funds in later periods. In particular, the pool-specific P1:P2 conversion ratio is calculated as described by Equation 1:

$$\text{Pool-specific P1:P2 conversion ratio} = \text{(the currency value of successes within a target pool in period 2)} / [\text{(the currency value of all proposals within the target pool submitted in period 2)} * \text{(the percentage Equation of those proposals scheduled to start in period 2, if funded)} + \text{(the currency value of all proposals within the target pool submitted in period 1)} * \text{(the percentage of those proposals scheduled to start in period 2, if funded)}]$$

Equation 1

Some examples utilize more specific versions of the pool-specific P1:P2 conversion ratio, such as the sponsor-specific, pool-specific and year-specific Y1:Y2 conversion ratio discussed further below.

In another example, prior to applying the conversion ratio, the forecast engine calculates the conversion ratio based, at least in part, on a grade assigned to the pool of grant proposals. In this example, the forecast engine parses the grade from the modeling parameters and uses the grade to determine a grade conversion ratio. The grade of the pool of grant proposals, and therefore the grade conversion ratio, may be determined based on a variety of characteristics. Examples of these characteristics include the past performance of an investigator, such as a faculty member or a group of faculty members, who drafted the grant proposal and the percentage of resubmissions within the pool of grant proposals. In some examples, the forecast engine applies either the grade conversion ratio or the P1:P2 conversion ratio to the pool of grant proposals. In other examples, the forecast engine applies both the P1:P2 conversion ratio and the grade conversion ratio to the pool.

In act 308, the aggregate lifetime value for the pool of predicted successes is chronologically distributed into a plurality of periods. In one example, the forecast engine performs this distribution according to an amortization schedule. In this example, the forecast engine determines the duration of the amortization schedule based on a statistical summary of the individual durations of the grant proposals included within the pool of grant proposals. In at least one example, the forecast engine uses an average duration that is weighted by the lifetime value of each grant proposal. As described above, the pools that are amortized in act 308 may share a common sponsor type, sector, proposal type or a combination of these or other characteristics.

In addition, the shape of the amortization schedule employed by the forecast engine within the act 308 may vary between pools. For instance, some examples employ a straight-line amortization schedule, while other examples may employ a front-end loaded, normally distributed or rear-end loaded schedule. In another example, the shape of the amortization schedule is "experience based." In this example, the shape of the amortization schedule is derived empirically by the forecast engine from the actual spending pattern of prior years' pools of successes. Thus examples are not limited to a particularly shaped amortization schedule or duration.

Processes such as the process 300 enable computer systems to predict currency values for successes resulting from a pool of grant proposals. In this way, processes in accord with the process 300 provide increased accuracy over conventional research portfolio management techniques. It is to be appreciated that, while pools typically include a plurality of grant proposals or successes, in some examples, pools may consist of single, individual grant proposals or successes where such individual treatment is warranted, such as where a proposal corresponds to a "mega-grant" as discussed further below.

Figure 4:
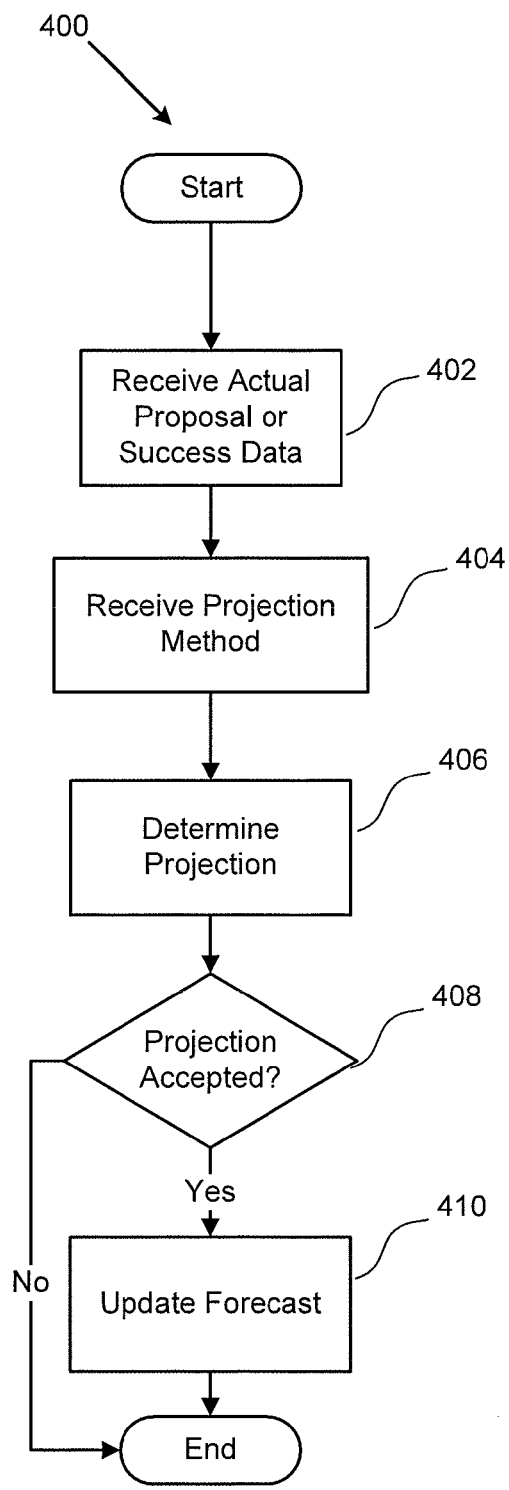
FIG. 4 is another flow diagram illustrating a process for incorporating actual successes into a period end forecast.
Figure 12:
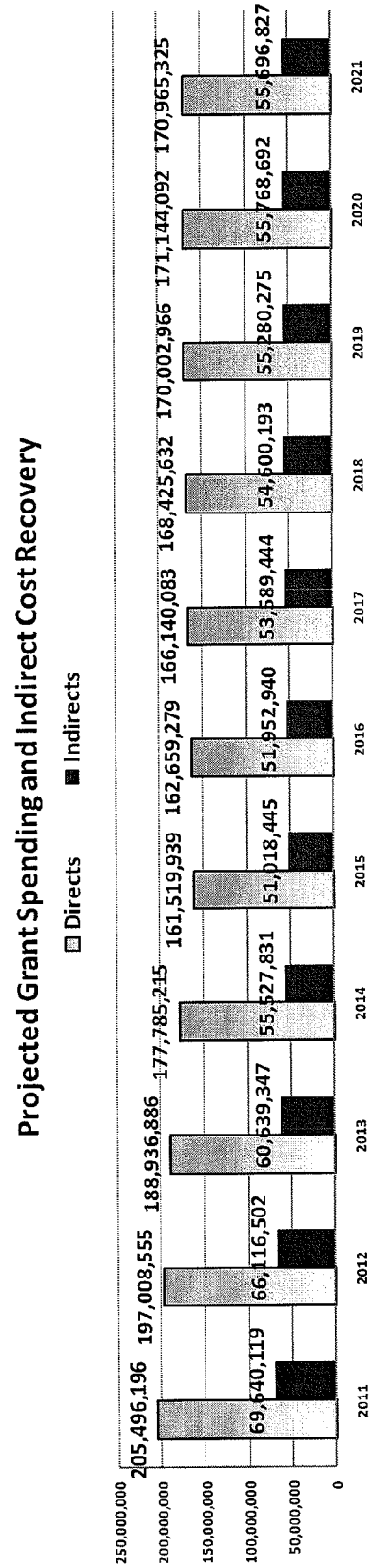
FIG. 12 is an exemplary interface display configured to display forecast results.

Another process for econometrically modeling research portfolios is illustrated by a process 400 shown FIG. 4. The process 400 tracks proposal and success activity, and consequently conversion ratios, within the current period in close to real-time and provides updated projections through the end of the current period. As shown in FIG. 4, the process 400 includes acts of receiving actual proposal or success data for the current period, receiving a selected projection method, determining the results of the projection method, receiving an indication as to whether the results are preferred over the current forecast, and updating the forecast.

In act 402, actual success or proposal information pertinent to the current period is received. In some examples, an interface within a computer system, such as the interface 104 described above with regard to FIG. 1, receives the actual proposal or success information from a data store, such as the grant data store 108. In other examples, the interface 104 receives the proposal or actual success information from a user, such as the user 102.

In act 404, a selected projection method is received. In at least one example, an interface, such as the interface 104, provides one or more screens through which to the interface receives the selected projection method. According to this example, the projection methods that may be selected via the interface include extrapolation, extension, and currently pending methods.

In act 406, a projection is determined using the selected projection method. In one example, a forecast engine, such as the forecast engine 106 determines the projection and an interface, such as the interface 104, displays the projection to the user. Examples of the projection methods used by the forecast engine include extrapolation, extension and currently pending methods.

According to the extrapolation method, the forecast engine calculates an extrapolation percentage from one or more historical time periods and applies the extrapolation percentage to the actual proposal or success information to project future proposals or successes. In some examples, the forecast engine calculates, for each of the one or more historical time periods, an extrapolation percentage by dividing a currency value of proposals or success from a first historical period that corresponds to the current period by a total currency value of proposals or successes accumulated at the end of a second historical period that corresponds to the period targeted for projection. Next, where more than one extrapolation percent has been calculated, the forecast engine calculates a statistical summary, such as an average, based on the extrapolation percentages. To project future proposals or successes, the forecast engine applies the extrapolation percentage, or the summary based on the extrapolation percentages, to the actual proposal or success information. In one example, the forecast engine applies the extrapolation percentage or the summary by dividing a currency value of the actual proposals or successes by the extrapolation percentage or the summary. When executing the extrapolation method, the forecast engine may select one or more historical time periods from several discrete time periods, for example from a prior year or multiple prior years. In some examples, the historical data used by the forecast engine to calculate the extrapolation percentage(s) is configurable and may be specified with modeling parameters such as those discussed above with reference to the process 300.

One example of the extrapolation method operates as follows. The forecast engine receives, via the interface, a request to extrapolate year end successes for 2011 to based on the pattern established in 2010. In response to this request, the forecast engine determines that the current year to date successes are $250,000 as of March 2011, that the end of year actual successes for 2010 were $1,400,000 and that the year to date actual successes for March 2010 were $240,000. Next, the forecast engine determines that the year to date successes for March of 2010 were approximately 17% of the year end successes for 2010. To project the year end successes for 2011, the forecast engine divides the current year to date successes of $250,000 by 17% yielding a year end projection of $1,470,000.

According to the extension method, the forecast engine calculates the projected extensions of the period to date actual proposals or successes as an average of corresponding periods within one or more previous periods. For instance, to determine a forecast for the months of October through December of the current year using the extension method, the forecast engine calculates a statistical summary, such as an average, of the actual success achieved in the same period of one or more previous years. Next, the forecast engine projects future proposals or successes by adjusting the summarized historical proposals or successes using a value that represents growth (or contraction) for the current year. The value that represents growth may be 1, which assumes no change from prior years, less than 1, which represents contraction, or greater than 1, which represents growth. In at least one example, the forecast engine determines the value that represents growth by comparing the actual proposal or success data of the current period to the historical proposal or success data from previous periods. To determine period end projections, the forecast engine sums the period to date actual proposals or successes with the projected future proposals or successes. As with the extrapolation method, the historical data used by the forecast engine to calculate the average of the prior periods may be specified with the modeling parameters discussed above. Some examples utilize historical data describing 1 to 4 or more prior years.

According to the currently pending method, the forecast engine determines a new conversion ratio that reflects the period to date actual successes and applies that conversion ratio to the currently forecasted pool of proposals having a start date prior to period end. In some examples of the currently pending method, the forecast to engine utilizes a P1:P2 conversion ratio, a grade conversion ratio or a combination of both. In other examples, when executing the currently pending method, the forecast engine provides two projections: one based on the new conversion ratio and one based on the prior conversion ratio. In this way, the forecast engine provides best case and worst case scenarios.

In act 408, a projection result that includes the projection or projections is displayed to a user. In one example, the forecast engine provides the projection result to the interface. In this example, the interface presents the projection result within a screen through which the interface receives an indication as to whether the projection result is accepted by the user. If the user does not accept the projection result, the process 400 ends. If the user accepts the projection result, in act 410 the interface updates the predicted grant proposal and success data within the grant data store 108 to reflect with the projection result. Processes such as the process 400 enable computer systems to increase the accuracy of current period predictions by augmenting those predictions with actual success data as it becomes available. It is to be appreciated that a user may, and often will, cause the grant management system to execute the process 400 several times in any given period to allow the user to review multiple projections and make decisions based on them.

Processes 300 and 400 depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. For example, rather than ending the process 400 where the projection is not accepted, the interface may prompt the user to select a different projection method and acts 404-410 may be re-executed. Furthermore, as discussed above, in at least one example, the acts are performed on a particular, specially configured machine, namely a computer system configured according to the examples disclosed herein.

Alternate Embodiments

According to some examples, a grant management system, such as the grant management system 100, projects grant spending and indirect cost recovery by amortizing a year's research portfolio of successes based on its weighted average duration. Moreover, some examples leverage the fact that different sponsors (for example, NIH, Other Federal, and Other Non Federal) behave differently in terms of the size and duration of the successes they fund. In these examples, the grant management system uses sponsor-specific weighted average durations.

To illustrate one such example, the NIH, which typically accounts for over half of the research conducted at academic medical centers, normally has a weighted average duration for NIH successes that exceeds four years. Moreover, investigators responsible for an NIH success usually have the option to continue their research and spend out the grant during a one year no-cost extension. Given these success characteristics, it is reasonable to assume that a large portfolio of NIH successes in one year will get spent as specified in Table 1:

TABLE 1

| Year 1 | Year 2 | Year 3 | Year 4 | Year 5 | Year 6 |
|---|---|---|---|---|---|
| 10% | 20% | 20% | 20% | 20% | 10% |

On average, the grant management system models the first period as a half year, followed by four periods of one year with the sixth period being another half year. The amortization assumption is five years, but since the first and last years are half years, a year's successes are spent out over six years. Further, the grant management system takes advantage of the fact that, from an econometric perspective, differences in behavior between individual projects within the portfolio will even out. However, very large projects could influence the outcome disproportionately, so the grant management system processes mega-grants—grants that exceed a selected lifetime dollar value threshold—separately from other types of grants.

Continuing this example, the grant management system loads an institution's history of successes and produces a forecast of grant spending and indirect cost recovery when a sufficient number of years of recorded and/or projected successes are to layered on top of one another. Table 2 illustrates an example based on a six year NIH amortization schedule:

TABLE 2

| | | Amortize Successes | | | | | |
|---|---|---|---|---|---|---|---|
| Year | Successes | Year −6 | Year −5 | Year −4 | Year −3 | Year −2 | Year −1 |
| −6 | 100 | 10 | 20 | 20 | 20 | 20 | 10 |
| −5 | 100 | | 10 | 20 | 20 | 20 | 20 |
| −4 | 100 | | | 10 | 20 | 20 | 20 |
| −3 | 100 | | | | 10 | 20 | 20 |
| −2 | 100 | | | | | 10 | 20 |
| −1 | 100 | | | | | | 10 |
| Projected Spending: | | | | | | | 100 |

In this illustration of Table 2, by Year −1, six years of successes have been amortized in the manner described above. The grant management system projects the cross-section of the amortized portions of six years of successes. Further, in some examples, the grant management system amortizes the direct grant spending and indirect cost recovery portions of a year's worth of successes separately. Direct grant spending is a measure of performance pertaining to the research mission of the institution. Indirect cost recovery is also a critical measure of financial performance since that revenue stream funds the costs incurred by the institution in support of research enterprise that cannot be charged off directly to individual grants—for example, facilities and administrative costs.

The concept of amortized successes highlights another dynamic that is present in most research portfolios. At any moment in time, some portion of future spending and indirect cost recovery is pre-determined by past success results. Extending the earlier amortization schedule into the future results in the distribution schedule of Table 3:

TABLE 3

| | | Amortize Successes | | | | | | | | | | |
|---|---|---|---|---|---|---|---|---|---|---|---|---|
| Year | Successes | Year −6 | Year −5 | Year −4 | Year −3 | Year −2 | Year −1 | Year 1 | Year 2 | Year 3 | Year 4 | Year 5 |
| −6 | 100 | 10 | 20 | 20 | 20 | 20 | 10 | | | | | |
| −5 | 100 | | 10 | 20 | 20 | 20 | 20 | 10 | | | | |
| −4 | 100 | | | 10 | 20 | 20 | 20 | 20 | 10 | | | |

TABLE 3-continued

| | | Amortize Successes | | | | | | | | | |
|---|---|---|---|---|---|---|---|---|---|---|---|
| Year | Successes | Year −6 | Year −5 | Year −4 | Year −3 | Year −2 | Year −1 | Year 1 | Year 2 | Year 3 | Year 4 | Year 5 |
| −3 | 100 | | | | 10 | 20 | 20 | 20 | 20 | 10 | | |
| −2 | 100 | | | | | 10 | 10 | 20 | 20 | 20 | 10 | |
| −1 | 100 | | | | | | 10 | 20 | 20 | 20 | 20 | 10 |
| 1 | 100 | | | | | | | 10 | 20 | 20 | 20 | 20 |
| 2 | 100 | | | | | | | | 10 | 20 | 20 | 20 |
| 3 | 100 | | | | | | | | | 10 | 20 | 20 |
| 4 | 100 | | | | | | | | | | 10 | 20 |
| 5 | 100 | | | | | | | | | | | 10 |
| | Project Grant Spending: | | | | | | | 100 | 100 | 100 | 100 | 100 | 100 |

As shown in Table 3, at the start of year 1, fully 90% of that year's outcome is pre-determined (based upon successes in years −6 through −1), 70% of the next year's result is pre-determined (based upon successes in years −5 through −1), 50% of year 3, and so on. To project the future, the grant management system projects successes in the current years and forecasts successes for future years.

As discussed above, some examples of the grant management system manifest an appreciation that successes, like awards, have a procedural antecedent that may be managed to the benefit of research institutions. Some research institutions track their "hit rate"—i.e. the number of proposals that get funded, but this metric has little utility in terms of predicting future successes—and therefore spending—because hit rates do no reflect the size of the proposals that are won or lost. For this reason, some examples of the grant management system track the relationship between the dollar or other currency value of all proposals submitted on an annual basis and the dollar value of those proposals that get funded by calculating a sponsor-specific Y1:Y2 conversion ratio.

The sponsor-specific Y1:Y2 conversion ratio reflects the fact there is a lag between the time a proposal is submitted and the time when the sponsor accepts the proposal and funds the project. Some of the proposals submitted are slated to start in the same year. Some are slated to start the next year. When an institution's proposal history is loaded into some examples, the Y1:Y2 conversion ratio is calculated. The Y1:Y2 conversion ratio is based upon a statistically-based, sponsor specific Y1:Y2 proposal-to-grant ratio and historical proposal and success data. The Y1:Y2 proposal-to-grant ratio can vary by sponsor and reflects the fact that a certain percentage of proposals in a given year, if funded, are scheduled to start in the current year (i.e., Y1), and the remaining percentage of proposals in the given year, if funded, are scheduled to start in the next year (i.e., Y2). For example, the NIH Y1:Y2 proposal-to-grant ratio might be 10%:90% meaning that 10% of a year's proposals are scheduled to start in the same year (Y1) if funded, and 90% are scheduled to start in the following year (Y2) if funded. The Y1:Y2 proposal-to-grant ratio can vary by sponsor and is a variable in the model that is set to approximate historical outcomes but can be modified if things change.

The Y1:Y2 conversion ratio is calculated according to Equation 2:

$$Y1:Y2 \text{ conversion ratio} = \\ \text{(the dollar value of successes in year 2)} / \\ [\text{(the dollar value of all proposals submitted in year 2)} * \\ \text{(the percentage of those scheduled} \\ \text{to start in year 2, if funded)} + \\ \text{(the dollar value of all proposals submitted} \\ \text{in year 1)} * \text{(the percentage of those} \\ \text{scheduled to start in year 2, if funded)}]$$

Equation 2

According to one example, the grant management system groups activity into as many as five "sectors." In an academic medical center, for example, the sectors might include the Basic Science departments (e.g. Biochemistry, Microbiology, and Physiology), the Clinical departments (e.g. Medicine, Surgery, and Psychiatry), and Centers and Institutes. Each of these sectors typically behaves somewhat differently in terms of the sponsors they solicit for funding and the types of research they do will often profile differently in terms of duration, indirect cost recovery, and renewability. When loaded with the history of an institution's proposals and successes, this example of the grant management system returns a historical summary by sector showing proposals, successes, and Y1:Y2 conversion ratios differentiated by sponsor type and proposal type—i.e. new versus competing renewal. Table 4 illustrates a proposal history for the Basic Science sector according to this example:

TABLE 4

| Basic Sciences | 2003 | 2004 | 2005 | 2006 | 2007 | 2008 | 2009 |
|---|---|---|---|---|---|---|---|
| NIH New Directs | 53,247,727 | 62,617,521 | 83,123,924 | 92,420,033 | 58,340,318 | 50,253,111 | 66,219,561 |
| NIH New Indirects | 26,043,390 | 29,919,387 | 39,083,413 | 47,762,104 | 31,528,118 | 28,050,184 | 31,349,871 |
| NIH Renewal Directs | 28,145,291 | 31,163,590 | 27,557,394 | 57,232,407 | 56,919,232 | 59,014,724 | 41,504,822 |
| NIH Renewal Indirects | 14,209,921 | 17,608,655 | 15,835,833 | 26,629,981 | 28,433,604 | 31,520,788 | 22,560,465 |
| Other Fed New Directs | 5,204,887 | 4,449,093 | 11,053,906 | 6,443,875 | 3,925,326 | 5,513,295 | 8,869,885 |
| Other Fed New Indirects | 2,937,550 | 1,431,809 | 6,053,064 | 3,444,937 | 2,207,904 | 3,064,800 | 4,190,990 |

TABLE 4-continued

| Basic Sciences | 2003 | 2004 | 2005 | 2006 | 2007 | 2008 | 2009 |
|---|---|---|---|---|---|---|---|
| Other Fed Renew Directs | 0 | 0 | 0 | 0 | 217,074 | 0 | 82,125 |
| Other Fed Renew Indirects | 0 | 0 | 0 | 0 | 0 | 30,030 | 0 |
| Non Fed Directs | 17,957,329 | 22,017,258 | 31,366,075 | 26,605,832 | 35,885,608 | 24,695,624 | 31,635,866 |
| Non Fed Indirects | 3,354,444 | 4,132,690 | 7,309,080 | 6,280,451 | 9,343,170 | 4,408,786 | 8,261,518 |
|  | 151,100,541 | 173,340,003 | 221,382,689 | 266,819,620 | 226,830,384 | 206,521,312 | 214,675,102 |

Table 5 shows successes for the same sector according to the same example:

TABLE 5

| Basic Sciences | 2004 | 2005 | 2006 | 2007 | 2008 | 2009 |
|---|---|---|---|---|---|---|
| NIH New Directs | 25,424,175 | 11,485,241 | 10,685,823 | 8,886,081 | 6,928,830 | 4,745,755 |
| NIH New Indirects | 14,012,524 | 5,157,661 | 5,793,366 | 4,991,426 | 3,748,599 | 1,875,143 |
| NIH Renewal Directs | 15,884,373 | 17,485,475 | 7,075,992 | 32,333,968 | 22,569,132 | 24,055,439 |
| NIH Renewal Indirects | 8,054,651 | 9,802,305 | 4,158,658 | 15,650,724 | 11,327,023 | 13,129,737 |
| Other Fed New Directs | 249,124 | 626,188 | 444,600 | 847,228 | 689,410 | 40,064 |
| Other Fed New Indirects | 23,623 | 107,781 | 266,315 | 375,288 | 343,729 | 0 |
| Other Fed Renew Directs | 0 | 0 | 0 | 11,318 | 0 | 2,872 |
| Other Fed Renew Indirects | 0 | 0 | 0 | 2,386 | 0 | 0 |
| Non Fed Directs | 4,046,523 | 3,720,389 | 5,979,615 | 7,586,343 | 5,191,909 | 4,836,394 |
| Non Fed Indirects | 1,061,573 | 347,872 | 1,029,576 | 583,176 | 910,339 | 1,162,758 |
|  | 68,756,566 | 48,732,911 | 35,433,947 | 71,267,940 | 51,708,972 | 49,848,163 |

If the Y1:Y2 proposal-to-grant ratio were set to 10%:90% for NIH, 30%:70% for Other Fed sponsors and 50%:50% for Non Fed sponsors, then the success outcomes from 2004 on would produce the Y1:Y2 conversion ratio results shown in Table 6:

TABLE 6

| Basic Sciences | 2003:2004 | 2004:2005 | 2005:2006 | 2006:2007 | 2007:2008 | 2008:2009 |
|---|---|---|---|---|---|---|
| NIH New Directs | 47% | 18% | 13% | 10% | 12% | 9% |
| NIH New Indirects | 53% | 17% | 15% | 11% | 12% | 7% |
| NIH Renewal Directs | 56% | 57% | 23% | 57% | 40% | 42% |
| NIH Renewal Indirects | 55% | 56% | 25% | 58% | 39% | 43% |
| Other Fed New Directs | 5% | 12% | 4% | 14% | 17% | 1% |
| Other Fed New Indirects | 1% | 6% | 5% | 11% | 15% | 0% |
| Other Fed Renew Directs | 0% | 0% | 0% | 52% | 0% | 35% |
| Other Fed Renew Indirects | 0% | 0% | 0% | 79% | 0% | 0% |
| Non Fed Directs | 22% | 16% | 19% | 28% | 15% | 19% |
| Non Fed Indirects | 31% | 8% | 14% | 9% | 10% | 24% |

In Table 6, the Y1:Y2 conversion ratio for 2003:2004 for NIH is calculated in the following manner:

$$2003:2004 = (25,424,175)/[(62,617,521)*(.10) + (53,247,727)(.9)]$$
$$= 25,424,175/[(6,261,752) + (47,922,954)]$$
$$= 25,424,175/54,184,706$$
$$= 47\%$$

The Y1:Y2 conversion ratios for other sponsor groups are calculated in a similar manner, but using the Y1:Y2 proposal-to-grant ratios specific to the particular sponsor.

To predict future successes, an external entity, such as a user, enters future proposal volumes and Y1:Y2 conversion ratios. This example of the grant management system provides the historical context for making predictions and a set of interface screens for entering the required information. This set of interface screens are illustrated by FIGS. 5-9. One interface screen provided by this example grant management system includes a proposal panel for the current fiscal year such as the proposal panel illustrated in FIG. 5. As shown in FIG. 5, the interface screen is configured to receive an indication of a baseline to be used for forecasting and a percentage adjustment to the baseline. The baselines available in this example of the grant management system include the prior year result, the prior 2 year average, the prior 3 year average and the prior 4 year average. FIG. 6 illustrates an interface screen configured to receive projected proposal growth or contraction for future years and shows actual proposal data and projected proposal data. FIG. 7 illustrates an interface screen configured to receive Y1:Y2 conversion ratios for the current fiscal year. FIG. 8 illustrates an interface screen configured to receive Y1:Y2 conversion ratios for future years.

From these projections of proposals and Y1:Y2 conversion ratios—specific to sector, sponsor type, proposal type, and direct and indirects—successes are projected and amortized according to the settings chosen on the Control Panel of this example of the grant management system, which is illustrated by FIG. 9. Note that this example of the grant management system permits different views of activity. This is important where, for example, investigators are appointed in one department but conduct some or all of their research in another.

Alternatively, the research might be differentiated by department in one instance or by the disease or problem under research in another. This example of the grant management system is adjustable in terms of the amortization schedule for successes by sponsor. It accommodates different fiscal years. It properly orients itself within the fiscal cycle. It is flexible with respect to the data that will be included in averages and extrapolations for analytical purposes. Further, the Y1:Y2 conversion ratio assumptions can be adjusted to by sponsor type and may differ by sector.

Furthermore, this example of the grant management system tracks year-to-date actuals for proposals and successes against budget—i.e. original projections for the year spread out by month based on average monthly distributions from prior years—and it provides an interface through which it may receive modifications to current year projections as the year moves along and more results become available. FIG. 10 illustrates a user interface screen configured to display year-to-date actuals and to receive modifications to current year projections.

The user interface screen shown in FIG. 10 is an exemplary proposal screen for the Basic Sciences. This user interface screen shows year-to-date actuals and presents three options for modifying projected proposals through year end:

Extrapolation—When this option is selected, this example of the grant management system extrapolates, using historical data describing one or more previous years, future values of proposals or successes using extrapolation percentages calculated for months corresponding to those being projected. In at least one example, these extrapolation percentages are the percentage of the year end proposals or successes represented by the year-to-date actuals. The previous years used are designated in the Control Panel described in FIG. 9. Next, the grant management system uses the extrapolation percentages to extrapolate the year-to-date actuals to year end. This selection is most useful in the early months of a fiscal year.

Previous Max—When this option is selected, this example of the grant management system projects year end results based on the highest volume achieved in within a previous year or span of years. According to this example, the grant management system analyzes the previous years designated in the Control Panel described in FIG. 9 to determine the highest volume used as the projection. This selection acts as a simple ceiling on expected year-end results if the other methods produce results that seem too aggressive based on prior experience.

Extension—When this option is selected, this example of the grant management system projects year end results based on YTD actuals and projected extensions for future months. In this example, the grant management system calculates the projected extensions as an average of the same months from the previous years designated in the Control Panel described in FIG. 9. This selection is most useful in the latter months of a fiscal year.

If "stay" is selected—as illustrated in FIG. 10—the year-end forecast remains the same as budget. Otherwise the selections that are made change the current year forecast and feed the results into the grant management system.

After expectations for the current year are modified, the user may indicate whether things are expected to "stay" at that level going into the next fiscal year, whether things will "revert" to the level previously expected for the current fiscal year, or whether the difference between budget and projection for the current year will be "split" (averaged) going into the next fiscal year. These options allow the grant management system to test "what if" scenarios and to test how sensitive future outcomes are to short-term trends.

During the course of the current year, actual success data is input and future successes are forecast or predicted in the same way for Y1:Y2 conversion ratios as illustrated by FIG. 11. This example of the grant management system provides two options for modifying Y1:Y2 conversion ratios as the current year progresses. The first—extrapolation—uses the same methodology as proposals and is most useful early in the fiscal year. The second method—"pending"—takes over as the year progresses. As the year goes on, the potential for new successes becomes more and more pre-determined by the actual proposals that have been submitted that have start dates that fall within the current fiscal year. More particularly, the current-pending method for projecting year-end successes takes year-to-date actuals and estimates additional successes based on the portfolio of pending proposals discounted by the most recent Y1:Y2 conversion ratio for the category. Here the Y1:Y2 conversion ratio is not the prior year-end result but is, rather, a 12 month rolling Y1:Y2 conversion ratio updated quarterly to capture trends as they are emerging.

Returning to FIGS. 5-8, the forward looking interface screens for proposals to and Y1:Y2 conversion ratios use the current year history as the expected transition from the current year to the next. Expectations for the future may then be entered. A user may use these interface screens as a tool to manage research portfolios. For instance, a user may use these screens to adjust model parameters to account for retirements, new hires, attrition, and the like. Further, in some examples, the interface 104 provides screens that receive information regarding new recruits. This new recruit information may include data such as a number of active grants, expected proposal volumes and conversion ratios and this new recruit information may be incorporated into the research portfolio model built by the grant management system. Expectations about NIH or other major federal sponsor funding, the economy in general, and other external factors might also influence model parameters. Further the model parameters may be adjusted based on who is being productive, where best practices are in play, and where improvement is necessary. Exhibit screens for each sector display overall historical, year-to-date, and anticipated sector results and comparative historical and year-to-date departmental results within the sector for a number of key performance metrics including: Proposal volume and counts, success volumes and counts, hit rate, Y1:Y2 conversion ratios, and proposals and successes by size bracket. This allows management to assess performance and set objectives for proposal growth and improvement in conversion ratios down to the department level and to monitor performance against those objectives in a medium that is as close to real time as possible.

This example of the grant management system returns a projection of direct grant spending and indirect cost recovery over a ten year planning horizon. A steady-state set of forecasting assumptions may return the profile illustrated in FIG. 12. Further, this example of the grant management system enables a user to test any number of scenarios and archive the tested scenarios for planning and management purposes.

This example of the grant management system also produces a projection of awards, such as NIH awards, using different methods than those that are used to project spending and indirect cost recovery. This projection includes information to indicating how the research institution operating the grant management system ranks vis-à-vis other research institutions. Awards are published and used in the most popular ranking systems for academic medical centers and research universities in general. Therefore, tracking and controlling to the standing of a research institution among its peer institutions is not an unimportant consideration, particularly in terms of faculty recruitment.

In summary, and in contrast to the conventional manner in which institutions attempt to "manage" their research portfolios by tracking annual awards on a comparative year-over-year and year-to-date basis, this example of the grant management system and the analytical and planning concepts embedded within it focus on the leading indicators of future results—proposals and conversion ratios. Further, the grant management system allows users to update their financial model as actual information becomes available to replace formerly projected information. These characteristics enable the grant management system to focus management's attention on what must be done over time in very practical terms by way of proposal volumes and conversion ratios to achieve short, intermediate and long-term strategic and financial objectives.

Another example illustrates how the multiple forecasting methods included in the grant management system provide a flexible forecasting framework to the institutional user. According to this example, the grant management system is configured to model a research portfolio for several fiscal years into the future. In this example, each fiscal year begins on July 1 of the current calendar year and ends on June 30 of the next calendar year. Further, according to this example, most of each fiscal year's grant proposals are included within three large pools, which if funded by the sponsor, start on July 1, December 1 and April 1. The grant proposals for these pools are submitted 9 months in advance of their decision dates.

In this example, the results of the currently pending method of forecasting fiscal year end success results are largely determined early in the year because shortly after the fiscal year begins, the Y1:Y2 conversion ratio for a substantial portion of the fiscal year is set, i.e. the July 1, December 1, and April 1 pools. In this situation, it may be advantageous to use the grading features of the grant management system to alter the forecast for the December 1 and April 1 pools based on information known that is likely to change the future conversion ratios of these pools from the current Y1:Y2 conversion ratio. For instance, if a large percentage of the December $1^{st}$ pool have investigators with a history of success, altering the forecast by assigning the December $1^{st}$ pool a high grade may lead to a more accurate forecast. Individual grant proposals, as used in this context, may be assigned a grade based on the quartile rank of the investigator. The overall December $1^{st}$ pool may also be assigned a Weighted Average Prior Success Quartile that is a statistical summary of the individual grant proposals' grades.

In at least one example a forecast engine, such as the forecast engine 106 described above with reference to FIG. 1, calculates the Weighted Average Prior Success Quartile from individual grant proposal grades. These individual grades may be received via an interface, such as the interface 104. In this example, the forecast engine also calculates a period end forecast using the grade conversion ratio resulting from the grades, as described above. While this example uses quartile rank of the investigator to assign grades to pools, other examples of the grant management system may employ other information to produce grades, such as the percentage of the pool that are original submissions vs. resubmissions as the likelihood of funding may differ between the two categories. Thus examples are not limited to grades based on particular types of information.

Still other examples provide a computer-based system and method for econometrically modeling, managing, and forecasting research funding. In some of these examples, historical grant proposal and success data is input to the system either manually or electronically (e.g., from data storage) via an interface, such as the interface 104. Based upon this historical grant proposal and success data and a sponsor unique Y1:Y2 proposal-to-grant ratio that reflects the dollar value of proposals that are submitted in a given year and are funded in that year or the year thereafter, a forecast engine, such as the forecast engine 106, calculates a Y1:Y2 conversion ratio. The Y1:Y2 conversion ratio reflects a current year's successes (i.e., funded grants) and models the fact that a certain percentage of those successes are due to proposals that were submitted in the current year, and the remainder are due to to proposals submitted in the prior year. Using the historical Y1:Y2 conversion ratio and grant proposal and success data from the current year, the forecast engine forecasts future research funding for the remainder of the year and beyond.

At least one example further incorporates amortization tables that can be unique to each sponsor and which reflect the different time horizons over which the funded research is to be performed and indirect cost recovery is to be earned. These amortization tables are determined based upon historical data and are used to model the time horizon over which the grant money will be spent. Based upon the historical grant proposal and success data, the amortization tables, the Y1:Y2 proposal-to-grant ratio, and the Y1:Y2 conversion ratio, the forecast engine forecasts future levels of research funding. The interface may display these forecasted levels of research funding in the aggregate, by sector, by sponsor, etc. During the current year actual proposal and success data can be input via the interface, and the predicted future levels of research funding updated. The forecast engine may predict the future levels of research funding at year's end based upon an extrapolation of grant proposals from a prior year, or an average over a period of years, or by an extension applied to the number of months remaining in the year.

Figure 13A:
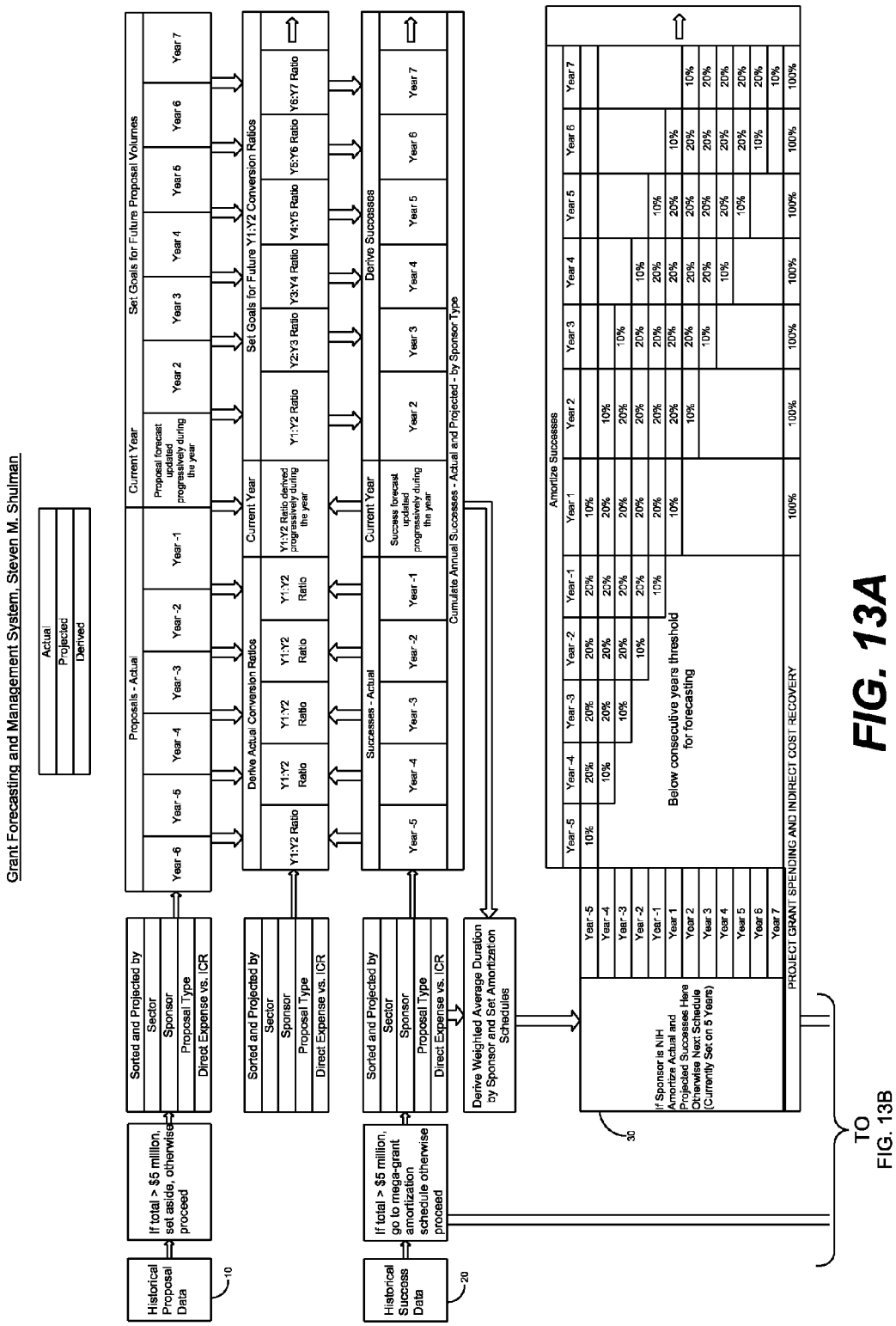
FIGS. 13A and 13B are a conceptual diagram of an exemplary grant management system.
Figure 13B:
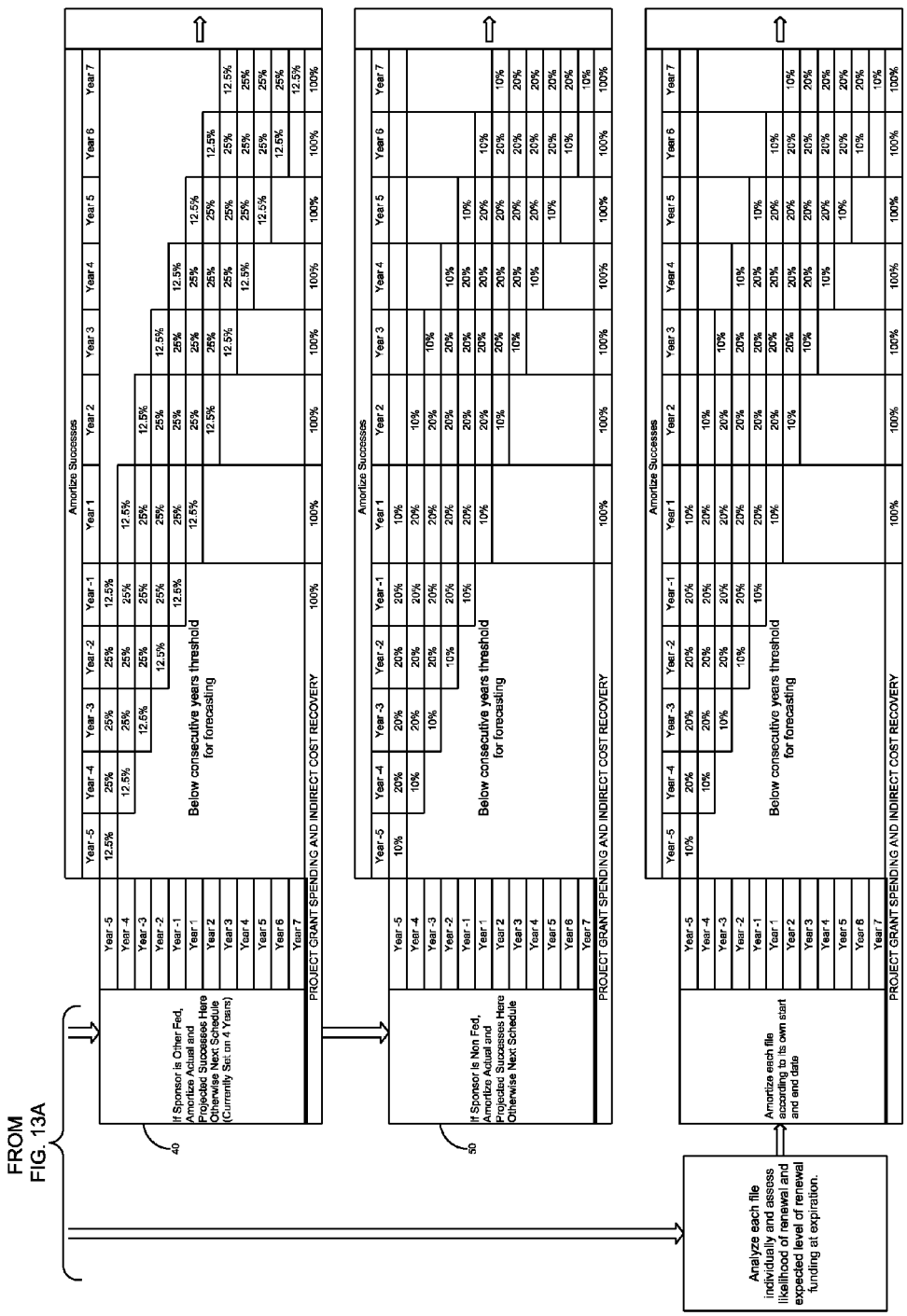

FIG. 13 is FIGS. 13A and 13B are a conceptual diagram of an econometrically-based grant forecasting and management system in accordance with an example. As shown in FIGS. 13A and 13B, historical proposal data 10 and historical success data 20 are input via the interface either manually or electronically (e.g., by exporting this data from an existing electronic database). This data includes direct grant funding as well as indirect cost recovery. The interface may sort and project this information by sector, by sponsor, by proposal type, and by the type of funding (e.g., direct or indirect cost recovery). As shown in FIGS. 13A and 13B, grant proposals and successes that could effect projections disproportionately if treated in the aggregate are handled on an individual basis, for example, those with a value in excess of $5 million.

As shown in FIGS. 13A and 13B, the forecast engine uses actual historical proposal data from Year −6 and Year −5 along with actual historical success data from Year −5 to derive an Actual Y1:Y2 conversion ratio. As described above, the forecast engine also uses the Y1:Y2 proposal-to-grant ratio, which may vary by sponsor, to derive the Y1:Y2 conversion ratio.

The forecast engine uses sponsor-specific amortization tables 30, 40, and 50 to amortize actual successes and projected future successes over a duration that is representative of the manner in which grant money is spent and indirect costs recovered for the particular sponsor. For example, NIH sponsored research grant money is typically spent/recovered over a five or six year period, other federal grant monies are typically spent/recovered over a four or five year period, and non federal grant monies are typically spent/recovered over a shorter period.

FIGS. 14-23 illustrate various screen displays that may be provided within the interface of an econometrically-based grant forecasting and management system in accordance with one example. For instance, FIG. 14 illustrates a screen display of a main control panel in accordance with one example. As shown, Mega-Grants (e.g., grants that exceed a specified dollar amount or duration) may be handled on an individual basis. FIG. 15 illustrates a screen display of a main page for a particular sector in accordance with one example. As shown in FIG. 15, future grant proposals may be extrapolated based upon prior proposal data from a prior year or years, limited to a previous maximum amount, or extended based upon the number of months remaining in the fiscal year and prior proposal data from a prior year or years. Future successes may be extrapolated based upon prior success data from a prior year or years, or based upon proposals that have already been submitted and which have start dates that fall within the current year.

Figure 16:
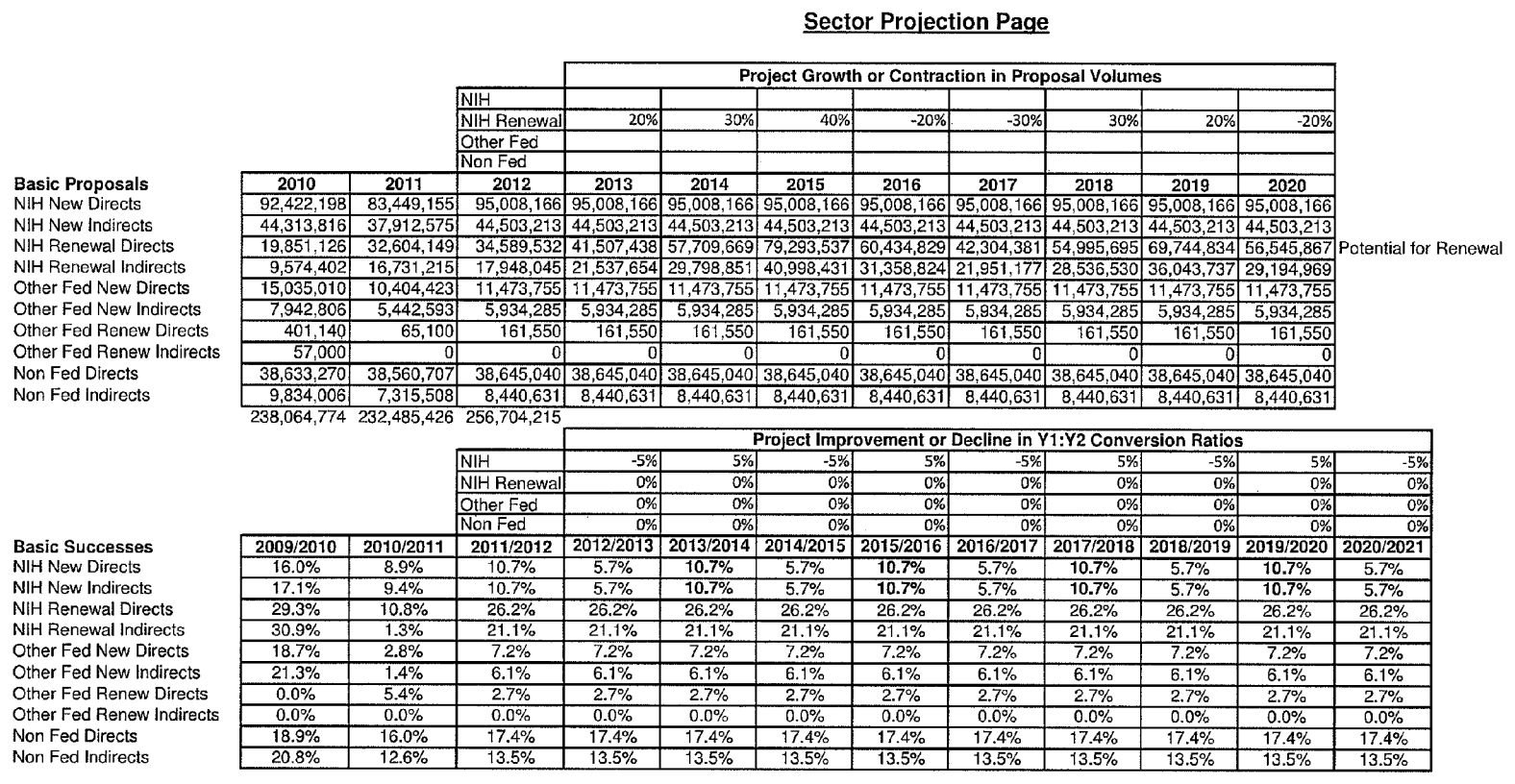

FIG. 16 illustrates a screen display of a forecast or prediction page for a particular sector in accordance with one example. As shown in FIG. 16, actual proposal data is shown for 2010, with projected proposal data shown for 2011 and 2012. Also shown in FIG. 16 are Y1:Y2 conversion ratios. The screen illustrated in FIG. 16 also includes a "Potential to Renew" indicator. This indicator highlights currency values that are driven by renewals rather than new proposals. Renewals typically get funded at a higher rate than new proposals because the renewals fund projects that are already underway. Renewals also tend to be larger grants since they are longer in duration and they are on-going. Given these important characteristics, to the application provides feedback on expiring grants to inform the user's projection of renewal volumes in the near term—i.e. this year and next.

FIGS. 17A and 17B illustrate a screen display of an extrapolation page in accordance with one example. As shown in FIGS. 17A and 17B, this information may be displayed by sector as well as by sponsor. FIGS. 18A, 18B and 18C illustrate a screen display of a simulation page in accordance with one example. As shown in FIGS. 18A, 18B and 18C, proposals and successes may be projected by sector and by sponsor.

Figure 21A:
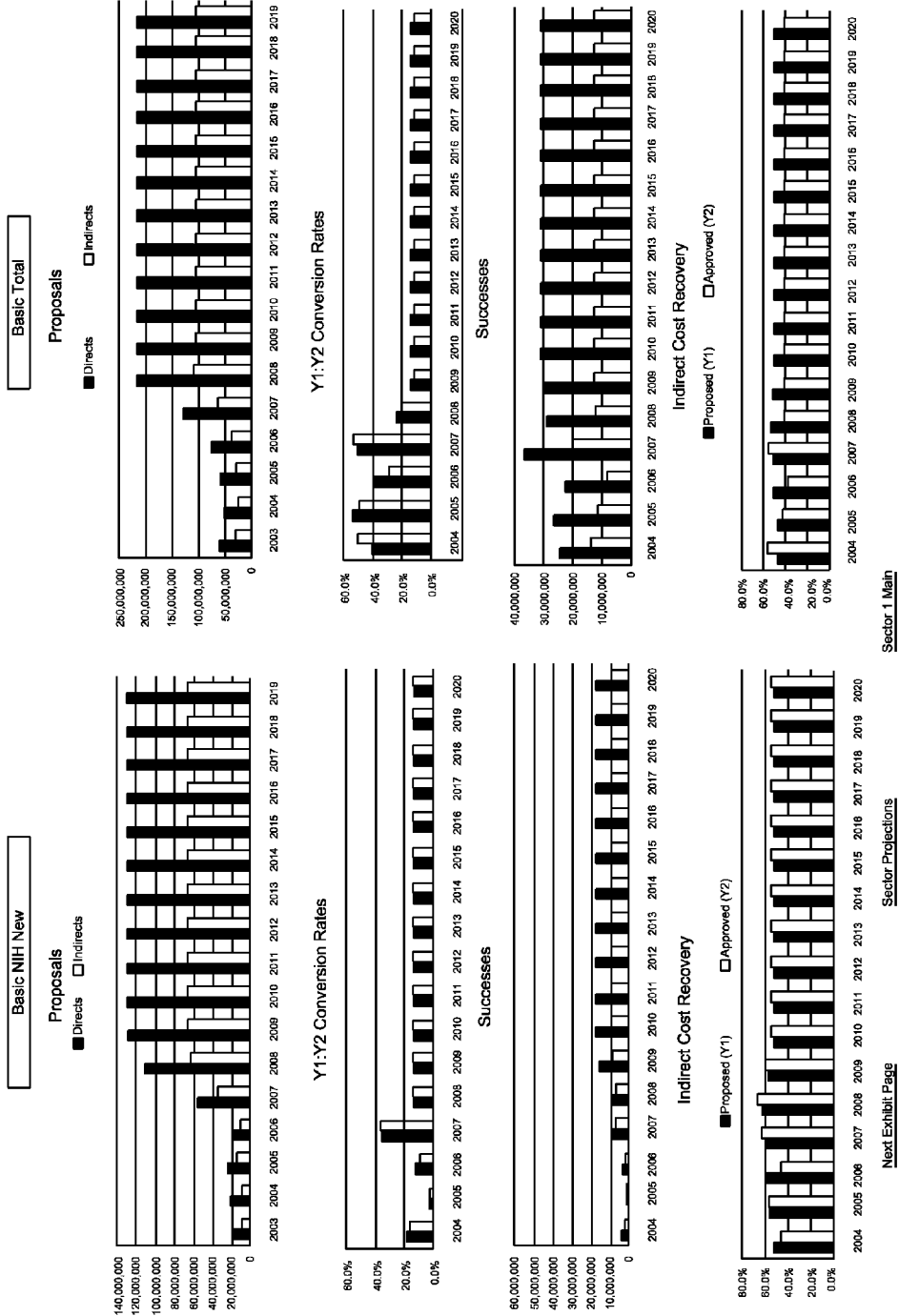
FIGS. 21A and 21B are an illustration of several output graphics generated by an exemplary grant management system.
Figure 21B:
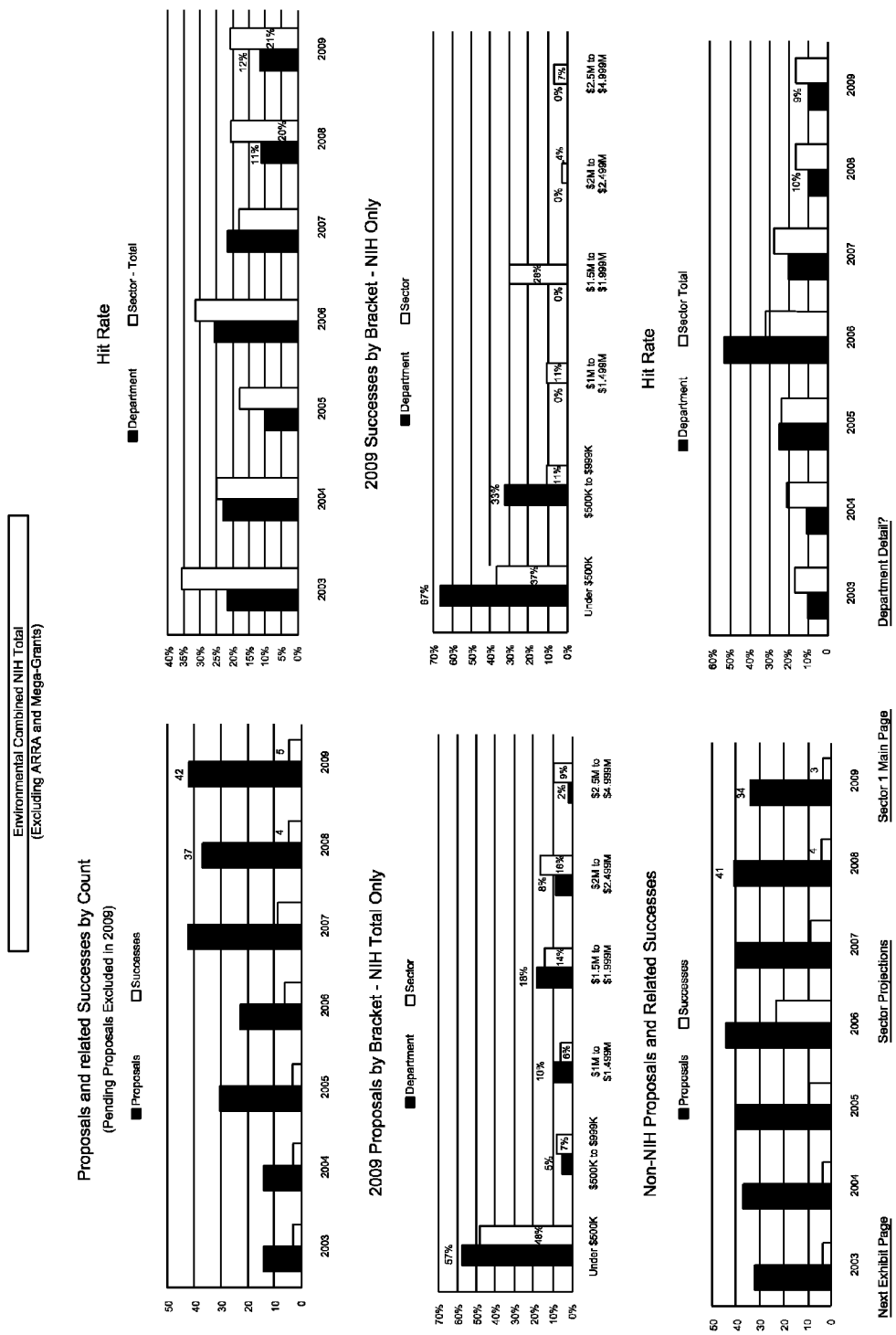

FIG. 19 illustrates a screen display of an amortization schedule and projected research funding based on that schedule in accordance with one example. FIGS. 20A, 20B and 20C illustrate a screen display of a 12 month rolling average in accordance with one example. FIGS. 21A and 21B illustrate a screen display of sector and department performance schedules that may be displayed in accordance with one example.

Figure 22:
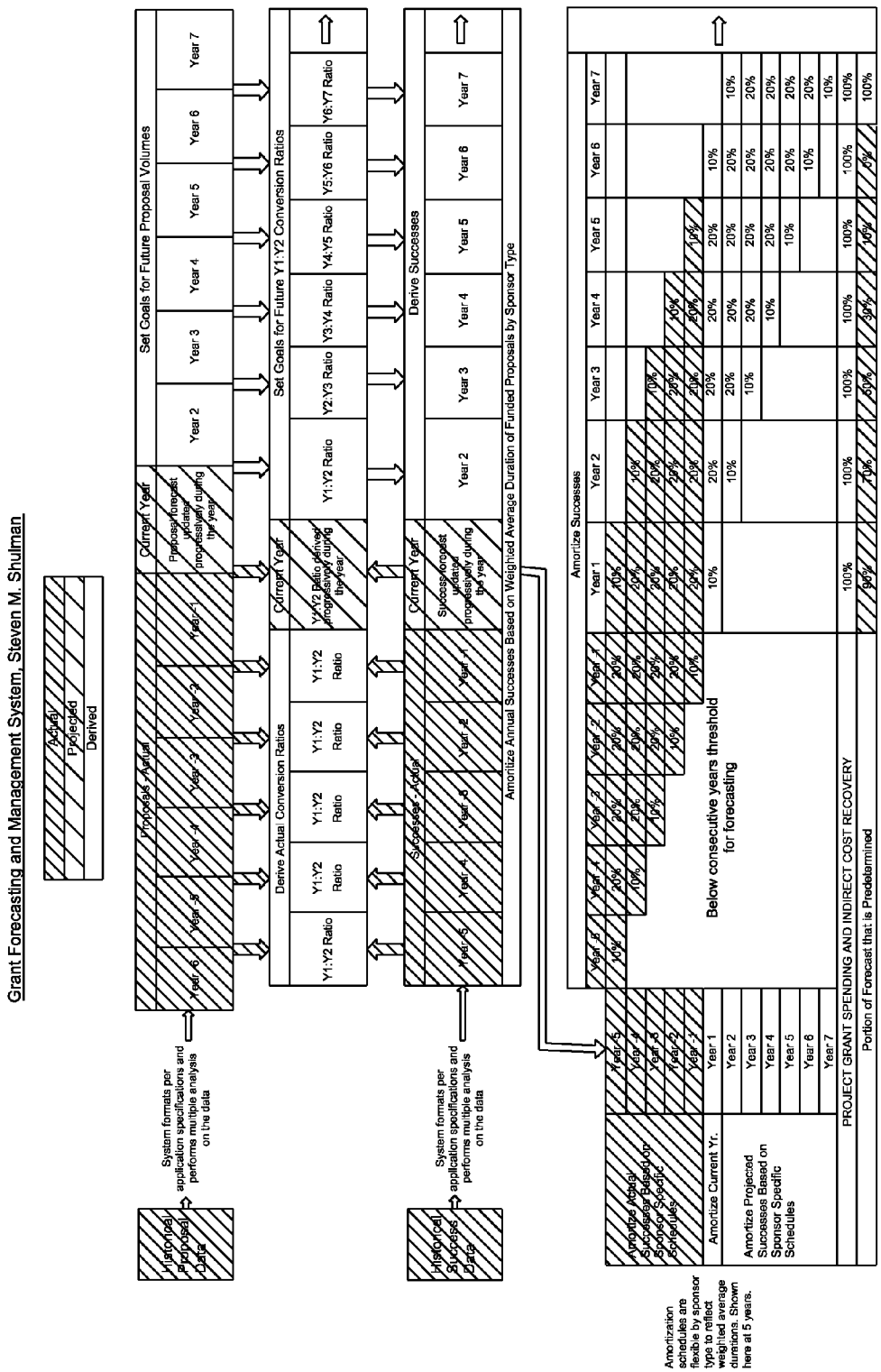
FIG. 22 is another conceptual diagram of an exemplary grant management system.

FIG. 22 is a simplified conceptual diagram of an econometrically-based grant forecasting and management system in accordance with an example. FIG. 22 is similar to FIGS. 13A and 13B, although only a single amortization table is shown, and the individual treatment of exceptional grants and successes is not shown. FIG. 23 illustrates a screen display of the types of historical grant proposal information that may be input to the grant forecast and management system in accordance with an example. This information includes the various departments involved, the investigator, the title of the grant proposal, the proposed start and end dates, the various sponsors involved and the direct grant spending and indirect cost recovery associated with each grant proposal.

Having thus described several aspects of at least one example, it is to be appreciated that various alterations, modifications, and improvements will readily occur to those skilled in the art. For instance, the bulk of the specification discusses use of grant management systems and methods in relation to academic medical centers. However, examples disclosed herein may also be used in other contexts such as technical institutions or any other institute where research portfolios are an important source of funding. Such alterations, modifications, and improvements are intended to be part of this disclosure, and are intended to be within the scope of the examples discussed herein. Accordingly, the foregoing description and drawings are to by way of example only.

What is claimed is:

1. A computer system for managing a research portfolio, the computer system comprising:
   a memory;
   a processor coupled to the memory;
   an interface executed by the processor and configured to receive information describing a plurality of grant proposals that each have a start date and a distribution schedule that specifies at least one award; and
   a forecast engine executed by the processor and configured to:
      process the information to determine a lifetime value for a subset of the plurality of grant proposals, the subset having a start date within a predetermined period; and
      predict a currency amount of grant successes for the predetermined period based on the lifetime value and a conversion ratio.

2. The computer system according to claim 1, wherein the forecast engine is configured to determine the conversion ratio based on a portion of the information that describes a past subset of the plurality of grant proposals that each have a start date prior to the predetermined period and information describing a plurality of grant successes that were produced by the past subset.

3. The computer system according to claim 2, wherein members of the subset share at least one common characteristic selected from the group comprising an investigator, a class of investigator, a class of sponsor, a sector, a grant proposal type and a funding type.

4. The computer system according to claim 3, wherein the at least one common characteristic includes a sector, class of sponsor and grant proposal type.

5. The computer system according to claim 3, wherein the forecast engine is further configured to distribute the currency amount of grant successes according to a distribution schedule of the subset.

6. The computer system according to claim 5, wherein the distribution schedule of the subset spans a plurality of periods including the predetermined period.

7. The computer system according to claim 5, wherein the forecast engine is configured to determine the distribution schedule of the subset using respective distribution schedules associated with members of the subset.

8. The computer system according to claim 7, wherein the distribution schedule of the subset specifies a weighted average duration of the respective individual durations.

9. The computer system according to claim 8, wherein the distribution schedule to specifies a straight-line distribution of substantially equal distribution amounts.

10. The computer system according to claim 8, wherein the distribution schedule specifies an experienced-based distribution that is empirically derived from the plurality of grant successes.

11. The computer system according to claim 1, wherein the forecast engine is configured to predict the currency amount of grant successes within the predetermined period based on at least a portion of the lifetime value and actual grant successes with awards scheduled for distribution during the predetermined period.

12. The computer system according to claim 11, wherein the forecast engine is configured to adjust the at least a portion of the lifetime value to reflect additional grant proposals to be evaluated within the predetermined period.

13. The computer system according to claim 12, wherein the forecast engine is configured to predict the additional grant proposals based on at least one of a historical extrapolation of period to date grant proposals, a historical extension of grant proposals having a start date prior to the predetermined period combined with actual period to date proposals and a previous maximum of grant proposals for prior periods.

14. The computer system according to claim 1, wherein the interface is configured to receive information indicating an association between a grade and the lifetime value and the forecast engine is configured to adjust, responsive to receiving the grade, the conversion ratio using the grade prior to predicting the currency amount of grant successes.

15. The computer system according to claim 14, wherein the grade indicates past successes of an investigator associated with the lifetime value.

16. The computer system according to claim 14, wherein the grade indicates a percentage of the lifetime value due to grant proposals that are original submissions.

17. The computer system according to claim 1, wherein the at least one award is a plurality of awards and the lifetime value is a sum of the plurality of awards.

18. The computer system according to claim 1, wherein the predetermined period is one year.

19. A computer implemented method for managing a research portfolio using a computer system, the method comprising:
    receiving, via an interface included in the computer system, information describing a plurality of grant proposals that each have a start date and a distribution schedule that specifies at least one award;
    processing, by a forecast engine included in the computer system, the information to determine a lifetime value for a subset of the plurality of grant proposals, the subset having a start date within a predetermined period; and
    predicting, by the forecast engine included in the computer system, a currency amount of grant successes for the predetermined period based on the lifetime value and a conversion ratio.

20. The method according to claim 19, wherein predicting the amount of grant successes includes determining the conversion ratio based on a portion of the information that describes a past subset of the plurality of grant proposals that each have a start date prior to the predetermined period and information describing a plurality of grant successes that were produced by the past subset.

21. The method according to claim 19, further comprising predicting the currency amount of grant successes within the predetermined period based on at least a portion of the lifetime value and actual grant successes with awards scheduled for distribution during the predetermined period.

22. A non-transitory computer readable medium having stored thereon sequences of instruction for managing a research portfolio including instructions that will cause at least one processor to:
    receive information describing a plurality of grant proposals that each have a start date and a distribution schedule that specifies at least one award;
    determine a lifetime value for a subset of the plurality of grant proposals, the subset having a start date within a predetermined period; and
    predict a currency amount of grant successes for the predetermined period based on the lifetime value and a conversion ratio.

23. The non-transitory computer readable medium according to claim 22, wherein the sequences of instruction include instructions that will cause the at least one processor to determine the conversion ratio based on a portion of the information that describes a past subset of the plurality of grant proposals that each have a start date prior to the predetermined period and information describing a plurality of grant successes that were produced by the past subset.

24. The non-transitory computer readable medium according to claim 22, wherein the sequences of instruction include instructions that will further cause the at least one processor to predict the currency amount of grant successes within the predetermined period based on at least a portion of the lifetime value and actual grant successes with awards scheduled for distribution during the predetermined period.

\* \* \* \* \*

UNITED STATES PATENT AND TRADEMARK OFFICE
CERTIFICATE OF CORRECTION

PATENT NO. : 8,271,372 B1
APPLICATION NO. : 13/092399
DATED : September 18, 2012
INVENTOR(S) : Steven M. Shulman It is certified that error appears in the above-identified patent and that said Letters Patent is hereby corrected as shown below:

In the Claims:

Column 26, Line 56, after the word "schedule" delete the word "to".

Signed and Sealed this
Twenty-sixth Day of February, 2013

Teresa Stanek Rea
*Acting Director of the United States Patent and Trademark Office*